(12) United States Patent
Kuniyasu et al.

(10) Patent No.: US 8,877,286 B2
(45) Date of Patent: Nov. 4, 2014

(54) METHOD FOR PRODUCING OPTICAL FILM

(75) Inventors: Satoshi Kuniyasu, Kanagawa (JP); Yoshiki Sugai, Kanagawa (JP); Tetsuya Asakura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 230 days.

(21) Appl. No.: 13/418,916

(22) Filed: Mar. 13, 2012

(65) Prior Publication Data

US 2012/0237673 A1 Sep. 20, 2012

(30) Foreign Application Priority Data

Mar. 14, 2011 (JP) ................................ P2011-055812

(51) Int. Cl.
| | | |
|---|---|---|
| B05D 5/06 | (2006.01) | |
| G02B 1/11 | (2006.01) | |
| G02B 5/02 | (2006.01) | |
| G02B 1/04 | (2006.01) | |
| B05D 7/00 | (2006.01) | |
| B05D 1/30 | (2006.01) | |

(52) U.S. Cl.
CPC . *G02B 1/11* (2013.01); *B05D 5/061* (2013.01); *G02B 5/0242* (2013.01); *B05D 7/53* (2013.01); *B05D 1/305* (2013.01); *G02B 1/04* (2013.01)
USPC ...................................................... 427/162

(58) Field of Classification Search
CPC ........ B05D 1/3059; B05D 5/061; B05D 7/53; G02B 1/04; G02B 1/11; G02B 5/0242
USPC ...................................................... 427/162
See application file for complete search history.

(56) References Cited

U.S. PATENT DOCUMENTS

| | | | |
|---|---|---|---|
| 2002/0068134 A1* | 6/2002 | Yagi et al. | 428/1.1 |
| 2002/0142133 A1* | 10/2002 | Matsunaga et al. | 428/141 |
| 2007/0207298 A1* | 9/2007 | Suzuki et al. | 428/216 |

FOREIGN PATENT DOCUMENTS

| | | |
|---|---|---|
| JP | 11-34243 A | 2/1999 |
| JP | 11-291383 A | 10/1999 |

(Continued)

OTHER PUBLICATIONS

Decision to Grant a Patent, dated May 1, 2013, for corresponding Japanese Patent Application No. 2011-055812, including English translation.

(Continued)

*Primary Examiner* — Michael Cleveland
*Assistant Examiner* — James M Mellott
(74) *Attorney, Agent, or Firm* — Birch, Stewart, Kolasch & Birch, LLP

(57) ABSTRACT

The method for producing an optical film includes a step of preparing a first coating liquid containing a certain amount of light-transmitting particles, a resin, and a solvent, a second coating liquid containing an amount less than the certain amount of light-transmitting particles, a resin, and a solvent, or not containing the light-transmitting particles but containing a resin and a solvent; a step of coating the second coating liquid and the first coating liquid in this order from the support side on a traveling band-shaped support in the form of a multilayer to form a second coating film and a first coating film; a step of transferring the light-transmitting particles in the first coating film to the side of the second coating film while drying the first coating film and the second coating film.

24 Claims, 4 Drawing Sheets

(56) References Cited

FOREIGN PATENT DOCUMENTS

| JP | 2002-350614 |   | 12/2002 |
|----|-------------|---|---------|
| JP | 2006-318450 | A | 11/2005 |
| JP | 2009-98666  | A | 5/2009  |
| JP | 2009-265658 | A | 11/2009 |
| JP | 4376368     | B | 12/2009 |

OTHER PUBLICATIONS

Notice of Reasons for Rejection, dated Jan. 22, 2013, for corresponding Japanese Application No. 2011-055812, including English translation.

* cited by examiner

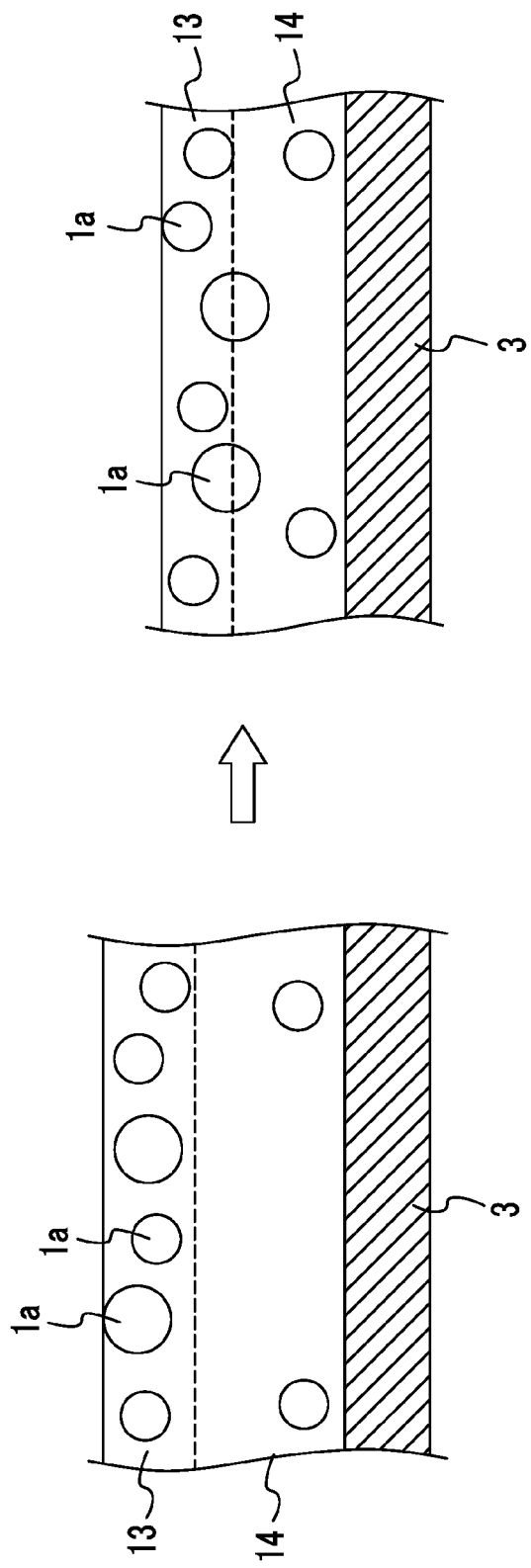

METHOD FOR PRODUCING OPTICAL FILM

BACKGROUND OF THE INVENTION

1. Field of the Invention

The present invention relates to a method for producing an optical film, in particular, a method for producing an optical film including an antiglare layer containing light-transmitting panicles.

2. Description of the Related Art

In various image display devices such as liquid crystal display device (LCD), plasma display panel (PDP), electroluminescent display (ELD) and cathode ray tube display device (CRT), an optical film such as an antiglare and antireflection film is used on the display surface so as to prevent reduction in the contrast due to reflection of outside light or reflection of an image. The antireflection film inhibits the reflection of an image or reduces the reflection rate by scattering or interfering with light. With the recent increasingly wide-spreading usage of LCDs in an office or household environment, it is required for an optical film to enhance the antiglare property of preventing a fluorescent lamp in a room or the viewer's image from causing disturbing reflection on the display surface and further improve the display contrast in a bright place.

The optical film having an antiglare property that is inexpensive and capable of mass production includes those obtained by coating a resin containing light-transmitting particles on a surface of a transparent support to form an antiglare layer having irregularities on the surface.

JP2005-316450A discloses an optical film, wherein the layer thickness, of an antiglare layer is more than the diameter of a light-transmitting particle, the light-transmitting particles aggregate at plural points in the horizontal and vertical direction of the film, and irregularities of the antiglare layer are formed by the aggregation of the light-transmitting particles.

JP4376368B discloses an optical film, wherein the layer thickness of an antiglare layer is less than the diameter of alight-transmitting particle, and, irregularities of the antiglare layer are formed by aligning the light-transmitting particles in the antiglare layer in one step.

However, the light-transmitting particles contain coarse particles attributable to the particle production, and the coarse particles becomes a cause of point defects during the production of an antiglare film, thus leading to decrease in the production yield of the antiglare film.

In order to solve the problem, there is a method to make the particle diameter of the light-transmitting particles uniform by classifying the light-transmitting particles.

SUMMARY OF THE INVENTION

However, since the light-transmitting particles are subjected to a classification treatment, the productivity of the light-transmitting particles decreases, and thus, the light-transmitting particles become expensive. For this reason, it has been difficult to produce an optical film which is inexpensive and has an antiglare property capable of mass production.

The invention has been made to solve the above-described problems, and it has an object to provide a method for producing an optical film, which has less point defects attributable to coarse particles and a good production yield.

The method for producing an optical film according to an embodiment of the invention includes a step of preparing a first coating liquid containing certain amounts of light-transmitting particles, a resin, and a solvent, a second coating liquid containing an amount less than certain amounts of light-transmitting particles, a resin, and a solvent, or not containing the light-transmitting particles but containing a resin and a solvent; a step of coating the second coating liquid and the first coating liquid in this order from the support side on a traveling band-shaped support in the form of a multilayer to form a second coating film and a first coating film; a step of transferring the light-transmitting particles in the first coating film to the side of the second coating film while drying the first coating film and the second coating film; and a step of curing the first coating film and the second coating film to form an antiglare layer including the light-transmitting particles and a resin layer, wherein when the average particle diameter of the light-transmitting particles is A and the average layer thickness of the antiglare layers is L, the presence ratio of the central position of the light-transmitting particle and the distance thereof from the support side in the resin layer, when viewing the cross-section in the vertical direction of the antiglare layer, satisfy the following relationship.

$$2L/3-A/6 \text{ to } L-A/2: 40\% \text{ to } 100\% \qquad (1)$$

$$L/3+A/6 \text{ to } 2L/3-A/6: 0\% \text{ to } 50\% \qquad (2)$$

$$A/2 \text{ to } L/3+A/6: 0\% \text{ to } 10\% \qquad (3)$$

According to the invention, the light-transmitting particles in the first coating film are transferred to the second coating film side while drying the first coating film and the second coating film. In the antiglare layer thus formed, the light-transmitting particles are unevenly distributed on the surface side of the resin layer, and at the same time, the light-transmitting particles can be prevented from significant protrusion from the surface layer of the antiglare layer. Particularly, since the light-transmitting particles having large particle diameters are transferred to the second coating film side, the light-transmitting particles having large particle diameters can be arranged on the support side in the resin layer. The light-transmitting particles having large particle diameters can be prevented from protrusion from the surface of the resin layer, and point defects can be inhibited.

Furthermore, by unevenly distributing the light-transmitting particles on the surface side of the resin layer, the light-transmitting particles can be effectively used for the formation of irregularities. The antiglare layer means one which contains particles in the resin layer and has a light diffusion function by forming irregularities on the surface of the resin layer.

For the method for producing an optical film according to another embodiment of the invention, the film thickness of the first coating film is preferably 1 time or more and less than 2 times the average particle diameter A of the light-transmitting particles. According to a still another embodiment, when forming an antiglare layer, the light-transmitting particles can be inhibited from stacking in the direction perpendicular to the film surface in the antiglare layer, whereby the point defects can be effectively prevented.

For the method for producing an optical film according to a still another embodiment of the invention, when the first coating film and the second coating film are dried, the first coating film and the second coating film are preferably arranged on the upper side with respect to the support. According to a still another embodiment, the light-transmitting particles in the first coating film can be transferred to the second coating film side using gravity.

For the method for producing an optical film according to a still another embodiment of the invention, the average layer thickness L of the antiglare layers and the average particle diameter A of the light-transmitting particles satisfy the relationship of 1.2<L/A<3.6. When L/A is less than 1.2, the antiglare property is too high, point defects easily occur, whereas when L/A is more than 3.6, the antiglare property decreases.

For the method for producing an optical film according to a still another embodiment of the invention, the light-transmitting particles preferably have an average particle diameter more than 1.5 µm and 10 µm or less.

For the method for producing an optical film according to a still another embodiment of the invention, when a mean spacing of irregularities of the antiglare layer is Sm, the antiglare layer preferably has a mean spacing of irregularities of Sm>40 µm. When the mean spacing of irregularities of Sm>40 µm is satisfied, a black plane having good clarity is obtained.

By the method for producing an optical film of the invention, it becomes possible to produce an optical film which has less point defects attributable to coarse particles and has an antiglare layer with a high production yield.

BRIEF DESCRIPTION OF THE DRAWINGS

FIGS. 4A and 4B are each a view showing the state of progress of drying the coating film.

DESCRIPTION OF THE PREFERRED EMBODIMENTS

Preferable embodiments of the invention will be described with reference to the accompanying figures. The invention is described with reference to preferable embodiments, but modifications can be made without departing from the range of the invention by many means, and thus, embodiments other than the present embodiments can be used. Therefore, all of the modifications within the range of the invention are encompassed by the appended claims.

The expression "from (numerical value 1) to (numerical value 2)" means "(numerical value 1) or more and (numerical value 2) or less". Further, the term "(meth)acrylate" in the present specification means "at least any one of acrylate and methacrylate". The same applies to "(meth)acrylic acid" and the like.

<Structure>

Figure 1:
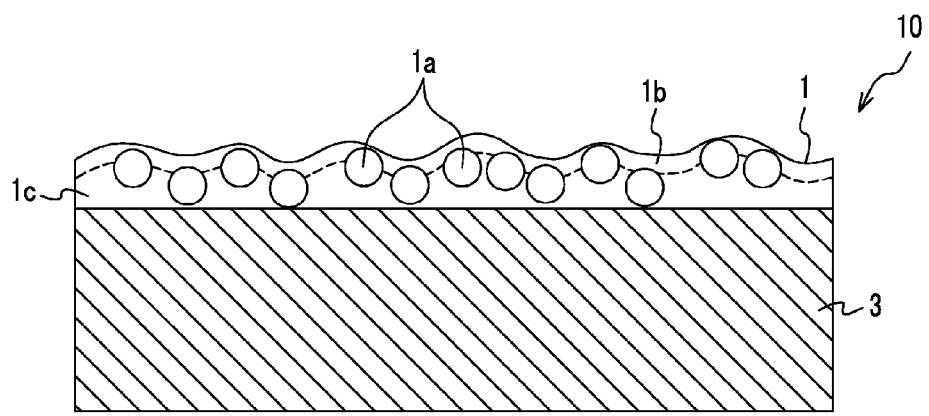
FIG. 1 is a cross-sectional view schematically showing an antiglare film.

FIG. 1 denotes a cross-sectional view of the basic structure of an antiglare film as one of optical films. The antiglare film 10 shown in FIG. 1 includes a support 3 and an antiglare layer 1 provided on the support 3. The antiglare layer 1 includes resin layers 1b and 1c, and light-transmitting particles 1a dispersed in the resin layers 1b and 1c. When the light-transmitting particles 1a are present, irregularities are formed on the surface of the antiglare layer 1. Antiglare is exhibited by the irregularities of the surface. According to the present embodiment, the antiglare layer 1 is produced by coating two kinds of coating liquid to give a multilayer, and includes the resin layers 1b and 1c. In FIG. 1, the boundary between the resin layers 1b and 1c is illustrated with dotted lines. However, the resin layers 1b and 1c on the antiglare layer 1 may in fact be integrally formed.

The antiglare film 10 is provided with at least one antiglare layer on a support 3. Depending on the purposes, other singular or plural functional layers can be provided. By forming a low refractive index layer on the upper layer of the antiglare layer 1, the reflection can be prevented. (In the case where the low refractive index layer is provided, it acts as an antireflection film). When the low refractive index layer is included, the antiglare film may be referred to as an antireflection film. Examples of the preferable constitution of the antiglare film and the antireflection film are shown below.

Support/Antiglare Layer
Support/Antiglare Layer/Low Refractive Index Layer
Support/Antiglare Layer/High Refractive Index Layer/Low Refractive Index Layer
Support/Antiglare Layer/High Refractive Index Layer/Medium Refractive Index Layer/Low Refractive Index Layer <Support>

The support is not particularly limited and may be a transparent resin film, a transparent resin plate, a transparent resin sheet or a transparent glass. Examples of the transparent resin film which can be used include a cellulose acylate film (e.g., cellulose triacetate film (refractive index of 1.48), cellulose diacetate film, cellulose acetate butyrate film, cellulose acetate propionate film), a polyethylene terephthalate film, a polyethersulfone film, a polyacrylic resin film, a polyurethane-based resin film, a polyester film, a polycarbonate film, a polysulfone film, a polyether film, a polymethylpentene film, a polyether ketone film, and a (meth)acrylonitrile film.

The support having a thickness of usually about 25 µm to 1000 µm may be used, but the thickness is preferably from 25 µm to 250 µm, and more preferably from 30 µm to 90 µm.

The support having a width arbitrarily selected may be used, but in view of handling, yield, and productivity, the width is usually from 100 to 5000 mm, preferably from 800 to 3000 mm, and more preferably from 1000 to 2000 mm.

The surface of the support is preferably smooth, the average roughness Ra value is preferably 1 µm or less, more preferably from 0.0001 to 0.5 µm, and even more preferably from 0.001 to 0.1 µm.

<Antiglare Layer>

The antiglare layer is formed for the purpose of providing the film with an antiglare property by surface scattering, and preferably with hard coatability for improving scratch resistance of a film.

The antiglare layer contains a binder capable of providing a hard coating property, light-transmitting particles providing an antiglare property, and an organic solvent as essential components. Irregularities on the surface are formed by projections of the light-transmitting particles themselves or by projections formed with aggregates of plural particles.

The antiglare layer formed by dispersion of the light-transmitting particles is composed of a binder and light-transmitting particles dispersed in the binder. The antiglare layer preferably has both an antiglare property and a hard coating property.

In the present embodiment, by coating two kinds of coating liquid to give a multilayer, the antiglare layer includes the resin layers 1b and 1c. Accordingly, depending on the function required for the antiglare layer 1, various desired materials are included in a coating liquid for forming the resin layers 1b and 1c.

The light-transmitting particles 1a preferably have a particle diameter of more than 1.5 µm and less than 10 µm. When the particle diameter of the light-transmitting particles 1a is more than 1.5 µm and 5 µm or less, the layer can be formed into a thin film whereby curling can be prevented. When the particle diameter of the light-transmitting particles 1a is more than 5 µm and less than 10 µm, generation of a Moire pattern from a black matrix and a lens sheet can be inhibited.

Figure 2:
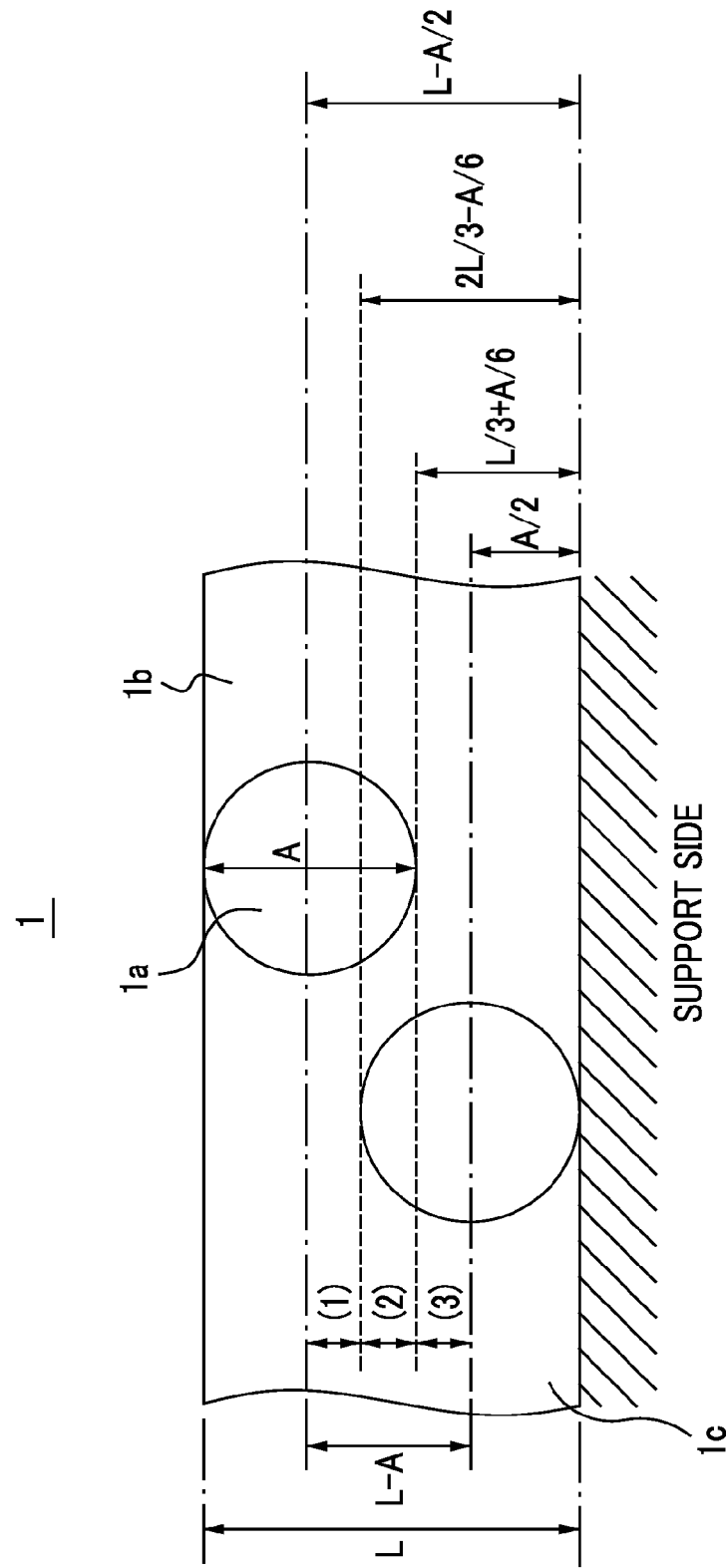
FIG. 2 is an explanatory view illustrating the presence ratio of the light-transmitting particles.

In the present embodiment, the light-transmitting particles 1a are unevenly distributed on the surface layer side of the resin layers 1b and 1c. FIG. 2 is a partially magnified view for the antiglare layer 1. The distribution of the light-transmitting particles 1a is evaluated according to the criteria for the central position of the light-transmitting particles 1a. The average particle diameter of the light-transmitting particles 1a is A and the average layer thickness of the antiglare layer 1 is L. When the ranges of (L-A) are divided into three classes of the regions (1) to (3), the presence ratio of the central position of the light-transmitting particles 1a and the distance of each region from the support side has the following relationship:

$$2L/3-A/6 \text{ to } L-A/2: 40\% \text{ to } 100\% \quad (1)$$

$$L/3+A/6 \text{ to } 2L/3-A/6: 0\% \text{ to } 50\% \quad (2)$$

$$A/2 \text{ to } L/3+A/6: 0\% \text{ to } 10\% \quad (3)$$

Furthermore, $2L/3-A/6$ to $L-A/2$ means a range more than $2L/3-A/6$ and $L-A/2$ or less; $L/3+A/6$ to $2L/3-A/6$ means a range more than $L/3+A/6$ and $2L/3-A/6$ or less; and $A/2$ to $L/3+A/6$ means a range of $A/2$ or more and $L/3+A/6$ or less.

By unevenly distributing the light-transmitting particles 1a on the surface layer side of the resin layers 1b and 1c, the light-transmitting particles 1a can be efficiently used for formation of the irregularities exhibiting an antiglare property. Further, for the light-transmitting particles 1a, a number of the light-transmitting particles 1a are not present on the support 3 side in the resin layers 1b and 1c. The light-transmitting particles 1a overlap and are prevented from significantly protruding from the resin layer 1b.

<High Refractive Index Layer and Medium Refractive Index Layer>

A high refractive index layer and a medium refractive index layer may be provided to enhance the antireflection property.

In the following specification, these high refractive index layer and medium refractive index layer are sometimes collectively referred to as a high refractive index layer. Incidentally, in the invention, the terms "high", "medium", and "low" in the high refractive index layer, medium refractive index layer and low refractive index indicate the relative size of refractive index among layers. In terms of the relationship with the transparent support, the refractive index preferably satisfies the relationships of transparent support>low refractive index layer and high refractive index layer>transparent support.

Furthermore, in the invention, the high refractive layer, the medium refractive layer, and the low refractive index layer are collectively referred to as an antireflection layer in some cases.

For producing an antireflection film by forming a low refractive index layer on a high refractive index layer, the refractive index of the high refractive index layer is preferably from 1.55 to 2.40, more preferably from 1.60 to 2.20, even more preferably from 1.65 to 2.10, and most preferably from 1.80 to 2.00.

In the case of producing an antireflection film by providing a medium refractive index layer, a high refractive index layer and a low refractive index layer in this order from the support side, the refractive index of the high refractive index layer is preferably from 1.65 to 2.40, more preferably from 1.70 to 2.20. The refractive index of the medium refractive index layer is adjusted to a value between the refractive index of the low refractive index layer and the refractive index of the high refractive index layer. The refractive index of the medium refractive index layer is preferably from 1.55 to 1.80.

The inorganic particles comprising $TiO_2$ as a main component, which are used in the high refractive index layer and the medium refractive index layer, are used in a dispersion state for the formation of the high refractive index layer and the medium refractive index layer.

At the dispersion of the inorganic particles, the inorganic particles are dispersed in a dispersion medium in the presence of a dispersant.

The high refractive index layer and the medium refractive index layer used in the invention each is preferably formed as follows. A coating composition for the formation of the high refractive index layer or medium refractive index layer is prepared by dispersing the inorganic particles in a dispersion medium and preferably further adding a binder precursor (for example, an ionizing radiation-curable polyfunctional monomer or polyfunctional oligomer as described later) necessary for the matrix formation, a photopolymerization initiator, and the like to the resulting liquid dispersion, and the obtained coating composition for the formation of the high refractive index layer or medium refractive index layer is coated on a transparent support and cured through a crosslinking or polymerization reaction of the ionizing radiation-curable compound (for example, a polyfunctional monomer and a polyfunctional oligomer).

Simultaneously with or after the coating of the high refractive index layer or medium refractive index layer, the binder of the high refractive index layer or medium refractive index layer is preferably crosslinked or polymerized with the dispersant.

The binder of the high refractive index layer or medium refractive index layer thus produced takes a form such that the anionic group of the dispersant is taken into the binder as a result of crosslinking or polymerization reaction between the above-described preferred dispersant and the ionizing radiation-curable polyfunctional monomer or oligomer. The anionic group taken into the binder of the high refractive index layer or medium refractive index layer has a function of maintaining the dispersed state of the inorganic particle, and the crosslinked or polymerized structure imparts a film-forming ability to the binder, whereby the high refractive index layer or medium refractive index layer containing the inorganic particle is improved in physical strength, chemical resistance, and weather resistance.

<Low Refractive Index Layer>

It is necessary to use a low refractive index layer so as to reduce the reflectance of the film of the invention.

The refractive index of the low refractive index layer is preferably from 1.20 to 1.46, more preferably from 1.25 to 1.46, and particularly preferably from 1.30 to 1.46.

The thickness of the low refractive index layer is preferably from 50 to 200 nm, more preferably from 70 to 100 nm. The haze of the low refractive index layer is preferably 3% or less, more preferably 2% or less, and most preferably 1% or less. The strength of the low refractive index layer is specifically, in the pencil hardness test with a load of 500 g, preferably H or more, more preferably 2H or more, and most preferably 3 or more.

In order to improve the antifouling performance of the optical film, the contact angle with water of the surface is preferably 90 degrees or more, more preferably 95 degrees or more, and particularly preferably 100 degrees or more.

The curable composition is preferably composed of a fluorine-containing polymer (A), inorganic particles (B), and an organosilane compound (C).

A binder is used in the low refractive index layer so as to disperse and fix the fine particles of the invention. Although the binder as described in the hard coat layer can be used as the binder, it is preferable to use a fluorine-containing polymer having a lower refractive index for the binder itself, a fluorine-containing colloid solution gel material, or the like. As the fluorine-containing polymer or fluorine-containing colloid solution gel, preferred is a material which crosslinks by heat or ionizing radiation, and provides the formed low refractive index layer surface with a kinetic friction coefficient of 0.03 to 0.30 and a contact angle to water of 85 to 120°.

(Constituents of Coating Liquid)

1-(1) Binder

The optical film of the present embodiment can be formed by a crosslinking or polymerization reaction of an ionizing radiation-curable compound. That is, a coating composition containing an ionizing radiation-curable polyfunctional monomer or oligomer as a binder is coated on a transparent support, and a crosslinking or polymerization reaction of the polyfunctional monomer or oligomer is brought about, whereby the optical film of the present embodiment can be formed.

The functional group in the ionizing radiation-curable polyfunctional monomer or oligomer is preferably a photo-, electron beam-, or radiation-polymerizable functional group, and more preferably a photopolymerizable functional group.

Examples of the photopolymerizable functional group include unsaturated polymerizable functional groups such as a (meth)acryloyl group, a vinyl group, a styryl group, and an allyl group, with a (meth)acryloyl group being preferred.

Specific examples of the photopolymerizable polyfunctional monomer having a photopolymerizable functional group include:

(meth)acrylic acid diesters of alkylene glycol, such as neopentyl glycol acrylate, 1,6-hexanediol (meth)acrylate, and propylene glycol di(meth)acrylate;

(meth)acrylic acid diesters of polyoxyalkylene glycol, such as triethylene glycol di(meth)acrylate, dipropylene glycol di(meth)acrylate, polyethylene glycol di(meth)acrylate, and polypropylene glycol di(meth)acrylate;

(meth)acrylic acid diesters of polyhydric alcohol, such as pentaerythritol di(meth)acrylate;

(meth)acrylic acid diesters of ethylene oxide or propylene oxide adducts, such as 2,2-bis{4-(acryloxy/diethoxy)phenyl}propane and 2,2-bis{4-(acryloxypoly-propoxy)phenyl}propane;

etc.

Furthermore, epoxy(meth)acrylates, urethane (meth)acrylates, and polyester(meth)acrylates may also be preferably used as the photopolymerizable polyfunctional monomer.

Among these, esters of a polyhydric alcohol and a (meth)acrylic acid are preferred, and a polyfunctional monomer having three or more (meth)acryloyl groups within one molecule is more preferred. Specific examples thereof include trimethylolpropane tri(meth)acrylate, trimethylolethane tri(meth)acrylate, 1,2,4-cyclohexane tetra(meth)acrylate, pentaglycerol triacrylate, pentaerythritol tetra(meth)acrylate, pentaerythritol tri(meth)acrylate, (di)pentaerythritol triacrylate, (di)pentaerythritol pentaacrylate, (di)pentaerythritol tetra(meth)acrylate, (di)pentaerythritol hexa(meth)acrylate, tripentaerythritol triacrylate, tripentaerythritol hexatriacrylate. The terms "(meth)acrylate", "(meth)acrylic acid", and "(meth)acryloyl" as used in the present specification mean "acrylate or methacrylate", "acrylic acid or methacrylic acid", and "acryloyl or methacryloyl", respectively.

As for the monomer binder, monomers differing in the refractive index may be used for controlling the refractive index of each layer. In particular, examples of the high refractive index monomer include bis(4-methacryloylthiophenyl)sulfide, vinylnaphthalene, vinyl phenyl sulfide, and 4-methacryloxyphenyl-4'-methoxyphenylthioether.

Furthermore, dendrimers described, for example, in JP2005-76005A and JP2005-36105A, and norbornene ring-containing monomers described, for example, in JP2005-60425A may also be used.

Two or more kinds of polyfunctional monomers may be used in combination of two or more kinds thereof.

The polymerization of such a monomer having an ethylenically unsaturated group may be performed by the irradiation of ionizing radiation or under heating, in the presence of a photoradical initiator or a thermal radical initiator.

In the polymerization reaction of the photopolymerizable polyfunctional monomer, a photopolymerization initiator is preferably used, and the photopolymerization initiator is preferably a photoradical polymerization initiator or a photocationic polymerization initiator, and particularly preferably a photoradical polymerization initiator.

1-(2) Polymer Binder

In the invention, a polymer or a crosslinked polymer can be used in combination as the binder. The crosslinked polymer preferably has an anionic group. The crosslinked polymer having an anionic group has a structure in which the main chain of the polymer having an anionic group is crosslinked.

Examples of the polymer main chain include polyolefin (saturated hydrocarbon), polyether, polyurea, polyurethane, polyester, polyamine, polyamide and melamine resins. A polyolefin main chain, a polyether main chain and a polyurea main chain are preferred, a polyolefin main chain and a polyether main chain are more preferred, and a polyolefin main chain is most preferred.

The polyolefin main chain comprises a saturated hydrocarbon. The polyolefin main chain is obtained, for example, by the addition polymerization reaction of an unsaturated polymerizable group. In the polyether main chain, repeating units are connected through an ether bond (—O—). The polyether main chain is obtained, for example, by the ring-opening polymerization reaction of an epoxy group. In the polyurea main chain, repeating units are connected through a urea bond (—NH—CO—NH—). The polyurea main chain is obtained, for example, by the condensation polymerization reaction of an isocyanate group and an amino group. In the polyurethane main chain, repeating units are connected through a urethane bond (—NH—CO—O—). The polyurethane main chain is obtained, for example, by the condensation polymerization reaction of an isocyanate group and a hydroxyl group (including an N-methylol group). In the polyester main chain, repeating units are connected through an ester bond (—CO—O—). The polyester main chain is obtained, for example, by the condensation polymerization reaction of a carboxyl group (including an acid halide group) and a hydroxyl group (including an N-methylol group). In the polyamine main chain, repeating units are connected through an imino bond (—NH—). The polyamine main chain is obtained, for example, by the ring-opening polymerization reaction of an ethyleneimine group. In the polyamide main chain, repeating units are connected through an amido bond (—NH—CO—). The polyamide main chain is obtained, for example, by the reaction of an isocyanate group and a carboxyl group (including an acid halide group). The melamine resin main chain is obtained, for example, by the condensation polymerization reaction of a triazine group (e.g., melamine) and an aldehyde (e.g., formaldehyde). Incidentally, in the melamine resin, the main chain itself has a crosslinked structure.

The anionic group is bonded directly to the polymer main chain or bonded to the main chain through a linking group. The anionic group is preferably bonded as a side chain to the Main chain through a linking group.

Examples of the anionic group include a carboxylic acid group (carboxyl), a sulfonic acid group (sulfo), and a phosphoric acid group (phosphono), with a sulfonic acid group and a phosphoric acid group being preferred.

The anionic group may be in a salt sate. The cation forming the salt with the anionic group is preferably an alkali metal ion. Further, the proton of the anionic group may be dissociated.

The linking group connecting the anionic group and the polymer main chain is preferably a divalent group selected from —CO—, —O—, an alkylene group, an arylene group and a combination thereof.

The crosslinked structure forms chemical bonding (preferably covalent bonding) of two or more main chains. The crosslinked structure preferably forms covalent bonding of three or more main chains. The crosslinked structure is preferably composed of a divalent or greater group selected from —CO—, —O—, —S—, a nitrogen atom, a phosphorus atom, an aliphatic residue, an aromatic residue and a combination thereof.

The crosslinked polymer having an anionic group is preferably a copolymer containing a repeating unit having an anionic group and a repeating unit having a crosslinked structure. In the copolymer, the proportion of the repeating unit having an anionic group is preferably from 2 to 96% by mass, more preferably from 4 to 94% by mass, and most preferably from 6 to 92% by mass. The repeating unit may have two or more anionic groups. In the copolymer, the proportion of the repeating unit having a crosslinked structure is preferably from 4 to 98% by mass, more preferably from 6 to 96% by mass, and most preferably from 8 to 94% by mass.

The repeating unit of the crosslinked polymer having an anionic group may have both an anionic group and a crosslinked structure. Further, other repeating units (a repeating unit having neither an anionic group nor a crosslinked unit) may be contained.

Other repeating units are preferably a repeating unit having an amino group or a quaternary ammonium group and a repeating unit having a benzene ring. The amino group or quaternary ammonium group has a function of, similarly to the anionic group, maintaining the dispersed state of the inorganic particles. Incidentally, the same effects can be obtained when the amino group, quaternary ammonium group or benzene ring is contained even in the repeating unit having an anion group or in the repeating unit having a crosslinked structure.

In the repeating unit having an amino group or a quaternary ammonium group, the amino group or quaternary ammonium group is bonded directly to the polymer main chain or bonded to the main chain through a linking group. The amino group or quaternary ammonium group is preferably bonded as a side chain to the main chain through a linking group. The amino group or quaternary ammonium group is preferably a secondary amino group, a tertiary amino group or a quaternary ammonium group, more preferably a tertiary amino group or a quaternary ammonium group. The group bonded to the nitrogen atom of the secondary or tertiary amino group or quaternary ammonium group is preferably an alkyl group, more preferably an alkyl group having 1 to 12 carbon atoms, and even more preferably an alkyl group having 1 to 6 carbon atoms. The counter ion of the quaternary ammonium group is preferably a halide ion. The linking group connecting the amino group or quaternary ammonium group and the polymer main chain is preferably a divalent group selected from —CO—, —NH—, —O—, an alkylene group, an arylene group and a combination thereof. In the case where the crosslinked polymer having an anionic group contains a repeating unit having an amino group or a quaternary ammonium group, the proportion of the repeating unit is preferably from 0.06 to 32% by mass, more preferably from 0.08 to 30% by mass, and most preferably from 0.1 to 28% by mass.

1-(3) Fluorine-Containing Polymer Binder

In the binder of the polymer in the invention, particularly, in the low refractive index layer, a fluorine-containing copolymer compound can be preferably used.

Examples of the fluorine-containing vinyl monomer mainly constituting the fluorine-containing copolymer include fluoroolefins (e.g., fluoroethylene, vinylidene fluoride, tetrafluoroethylene, hexafluoropropylene), partially or completely fluorinated alkyl ester derivatives of (meth)acrylic acid (e.g., VISCOAT 6FM (trade name, manufactured by Osaka Organic Chemical Industry Ltd.), "R-2020" (trade name, manufactured by Daikin Industries, Ltd.), and completely or partially fluorinated vinyl ethers. Among these, perfluoroolefins are preferred, and in view of refractive index, solubility, transparency, availability, and the like, hexafluoropropylene is particularly preferred. When the compositional ratio of the fluorine-containing vinyl monomer is increased, the refractive index may be lowered but the film strength tends to decrease. In the invention, the fluorine-containing vinyl monomer is preferably introduced such that the copolymer has a fluorine content of 20 to 60% by mass, more preferably from 25 to 55% by mass, and particularly preferably from 30 to 50% by mass.

The constituent unit for imparting crosslinking reactivity mainly includes the following units (A), (B), and (C):

(A): a constituent unit obtained by the polymerization of a monomer previously having a self-crosslinking functional group within the molecule, such as glycidyl (meth)acrylate and glycidyl vinyl ether, (B): a constituent unit obtained by tile polymerization of a monomer having a carboxyl group, a hydroxy group, an amino group, a sulfo group, or the like {such as (meth)acrylic acid, methylol(meth)acrylate, hydroxyalkyl(meth)acrylate, allyl acrylate, hydroxyethyl vinyl ether, hydroxybutyl vinyl ether, maleic acid, and crotonic acid}, and (C): a constituent unit obtained by reacting a compound having a group capable of reacting with the functional group of (A) or (B) above and another crosslinking functional group within the molecule, with the constituent unit of (A) or (B) above (for example, a constituent unit which can be synthesized by a method of causing an acrylic acid chloride to act on a hydroxyl group).

In the constituent unit of (C) the crosslinking functional group is preferably a photopolymerizable group. Examples of the photopolymerizable group include a (meth)acryloyl group, an alkenyl group, a cinnamoyl group, a cinnamylideneacetyl group, a benzalacetophenone group, a styrylpyridine group, an α-phenylmaleimide group, a phenylazide group, a sulfonylazide group, a carbonylazide group, a diazo group, an o-quinonediazide group, a furylacryloyl group, a coumarin group, a pyrone group, an anthracene group, a benzophenone group, a stilbene group, a dithiocarbamate group, a xanthate group, a 1,2,3-thiadiazole group, a cyclopropene group, and an azadioxabicyclo group. Not only one of these groups but also two or more kinds thereof may be contained. Among these, a (meth)acryloyl group and a cinnamoyl group are preferred, and a (meth)acryloyl group is particularly preferred.

The specific method for producing the photopolymerizable group-containing copolymer includes, but is not limited to, the following methods:

a. a method of reacting a (meth)acrylic acid chloride with a crosslinking functional group-containing copolymer having a hydroxyl group, thereby effecting esterification, b. a method of reacting an isocyanate group-containing (meth)acrylic acid ester with a crosslinking functional group-containing copolymer having a hydroxyl group, thereby effecting urethanization, c. a method of reacting a (meth)acrylic acid with a crosslinking functional group-containing copolymer having an epoxy group, thereby effecting esterification, and d. a method of reacting an epoxy group-containing (meth) acrylic acid ester with a crosslinking functional copolymer having a carboxyl group, thereby effecting esterification.

In addition, the amount of the photopolymerizable group introduced can be arbitrarily adjusted and, for example, from the standpoint of stabilizing the coating surface state, reducing the surface state failure when inorganic particles are also present, or enhancing the film strength, a carboxyl group, a hydroxyl group, or the like may remain.

In the polymer useful in the invention, in addition to the repeating unit derived from the fluorine-containing vinyl monomer and the constituent unit for imparting crosslinking property, other vinyl monomers may be appropriately copolymerized from various viewpoints such as adhesion to substrate, Tg (contributing to film hardness) of polymer, solubility in solvent, transparency, slipperiness, and a dust protection and antifouling property. A plurality of these vinyl monomers may be combined according to the purpose, and these monomers are preferably introduced to account for, in total, from 0 to 65% by mole, more preferably from 0 to 40% by mole, and particularly preferably from 0 to 30% by mole, in the copolymer.

The vinyl monomer unit which can be used in combination is not particularly limited, and examples thereof include olefins (ethylene, propylene, isoprene, vinyl chloride, vinylidene chloride, and the like), acrylic acid esters (methyl acrylate, ethyl acrylate, 2-ethylhexyl acrylate, 2-hydroxyethyl acrylate, and the like), methacrylic acid esters (methyl methacrylate, ethyl methacrylate, butyl methacrylate, and 2-hydroxyethyl methacrylate), styrene derivatives (styrene, p-hydroxymethylstyrene, p-methoxystyrene, and the like), vinyl ethers (methyl vinyl ether, ethyl vinyl ether, cyclohexyl vinyl ether, hydroxyethyl vinyl ether, hydroxybutyl vinyl ether, and the like), vinyl esters (vinyl acetate, vinyl propionate, vinyl cinnamate, and the like), unsaturated carboxylic acids (acrylic acid, methacrylic acid, crotonic acid, maleic acid, itaconic acid, and the like), acrylamides (N,N-dimethylacrylamide, N-tert-butylacrylamide, N-cyclohexylacrylamide, and the like), methacrylamides (N,N-dimethylmethacrylamide), and acrylonitrile.

The fluorine-containing copolymer particularly useful in the invention is a random copolymer of perfluoroolefin with vinyl ethers or vinyl esters. In particular, the fluorine-containing polymer preferably has a group capable of undergoing a crosslinking reaction by itself (for example, a radical reactive group such as a (meth)acryloyl group, and a ring-opening polymerizable group such as an epoxy group and an oxetanyl group). The crosslinking reactive group-containing polymerization unit preferably occupies front 5 to 70% by mole, more preferably from 30 to 60% by mole, in all polymerization units of the polymer. Preferred examples of the polymer include those described in JP2002-243907A, JP2002-372601A, JP2003-26732A, JP2003-222702A, JP2003-294911A, JP2003-329804A, JP2004-4444A, and JP2004-45462A.

Furthermore, for the purpose of an imparting antifouling property, a polysiloxane structure is preferably introduced into the fluorine-containing polymer of the invention. The method for introducing a polysiloxane structure is not limited, but preferred examples thereof include a method of introducing a polysiloxane block copolymerization component by using a silicone macroazo initiator described in JP1994-93100A (JP-H06-93100A), JP1999-189621A (JP-H11-189621A), JP1999-228631A (JP-H11-228631A), and JP2000-313709A; and a method of introducing a polysiloxane graft copolymerization component by using a silicone macromer described in JP1990-251555A (JP-H02-251555) and JP1990-308806A (JP-H02-308806A). Particularly preferred compounds include the polymers in Examples 1, 2, and 3 of JP1999-189621A (JP-H11-189621A), and Copolymers A-2 and A-3 of JP1990-251555A (JP-H02-251555A). The content of the polysiloxane component in the polymer is preferably from 0.5 to 10% by mass, and particularly preferably from 1 to 5% by mass.

The molecular weight of the copolymer which can be preferably used in the invention is preferably 5000 or more, more preferably from 10000 to 500000, and most preferably from 15000 to 200000, in terms of the mass average molecular weight. It is also possible to improve the coating surface state or scratch resistance by using polymers differing in the average molecular weight in combination.

A curing agent having a polymerizable unsaturated group described in JP1998-25388A (JP-H10-25388A) and JP2000-17028A may be appropriately used in combination with the above-described copolymer. Furthermore, as described in JP2002-145952A, use in combination with a compound having a fluorine-containing polyfunctional polymerizable unsaturated group is also preferred. Examples of the compound having a polyfunctional polymerizable unsaturated group include the polyfunctional monomers described above for the hard coat layer. Among these compounds, in particular, a compound having a polymerizable unsaturated group in the polymer main body is preferred because use of the compound in combination produces a great effect in the improvement of scratch resistance.

1-(4) Organosilane Compound

In view of scratch resistance, at least one layer out of the layers constituting the film of the invention is preferably formed using at least one component, a so-called sol component (which may be hereinafter sometimes referred to in this way), selected from a hydrolysate of an organosilane compound and/or a partial condensate thereof.

The sol component is particularly preferably incorporated into the low refractive index layer and the functional layer, particularly to satisfy both the antireflection performance and the scratch resistance with respect to the antireflection film. This sol component forms a cured product by undergoing condensation during drying and heating after coating the coating liquid, and works out to a part of the binder in the above layer. Further, in the case where the cured product has a polymerizable unsaturated bond, a binder having a three-dimensional structure is formed upon irradiation with actinic rays.

The organosilane compound is preferably represented by the following general formula 1:

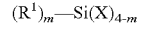    General Formula 1

In the general formula (1), $R^1$ represents a substituted or unsubstituted alkyl group or a substituted or unsubstituted aryl group. The alkyl group is preferably an alkyl group having 1 to 30 carbon atoms, more preferably 1 to 16 carbon atoms, and particularly preferably 1 to 6 carbon atoms. Specific examples of the alkyl group include methyl, ethyl, propyl, isopropyl, hexyl, decyl, and hexadecyl. Examples of the aryl group include phenyl and naphthyl, with a phenyl group being preferred.

X represents a hydroxyl group or a hydrolyzable group, and examples thereof include an alkoxy group (preferably an alkoxy group having 1 to 5 carbon atoms, for example, a methoxy group and an ethoxy group), a halogen atom (for example, Cl, Br, and I) and a group represented by $R^2COO$ (wherein $R^2$ is preferably a hydrogen atom or an alkyl group having 1 to 6 carbon atoms, for example, $CH_3COO$ and $C_2H_5COO$). An alkoxy group is preferred, and a methoxy group and an ethoxy group are more preferred; and m represents an integer of 1 to 3, and is preferably 1 to 2.

When a plurality of X's are present, the plurality of X's may be the same as or different from each other.

The substituent incorporated in $R^1$ is not particularly limited, but examples thereof include a halogen atom (fluorine, chlorine, bromine, and the like), a hydroxyl group, a mercapto group, a carboxyl group, an epoxy group, an alkyl group (methyl, ethyl, i-propyl, propyl, t-butyl, and the like), an aryl group (phenyl, naphthyl, and the like), an aromatic heterocyclic group (furyl, pyrazolyl, pyridyl, and the like), an alkoxy group (methoxy, ethoxy, i-propoxy, hexyloxy, and the like), an aryloxy group (phenoxy and the like), an alkylthio group (methylthio, ethylthio, and the like), an arylthio group (phenylthio, and the like), an alkenyl group (vinyl, 1-propenyl, and the like), an acyloxy group (acetoxy, acryloyloxy, methacryloyloxy, and the like), an alkoxycarbonyl group (methoxycarbonyl, ethoxycarbonyl, and the like), an aryloxycarbonyl group (phenoxycarbonyl and the like), a carbamoyl group (carbamoyl, N-methylcarbamoyl, N,N-dimethylcarbamoyl, N-methyl-N-octylcarbamoyl, and the like), and an acylamino group (acetylamino, benzoylamino, acrylamino, methacrylamino, and the like). These substituents each may be further substituted.

$R^1$ is preferably a substituted alkyl group or a substituted aryl group. Among these, an organosilane compound having a vinyl polymerizable substituent represented by the following general formula 2 is more preferred.

General Formula 2

[Chem. 1]

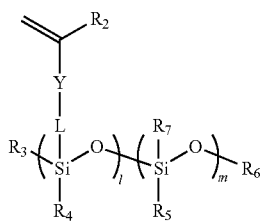

In the general formula 2, $R^2$ represents a hydrogen atom, a methyl group, a methoxy group, an alkoxycarbonyl group, a cyano group, a fluorine atom or a chlorine atom. Examples of the alkoxycarbonyl group include a methoxycarbonyl group and an ethoxycarbonyl group. $R^2$ is preferably a hydrogen atom, a methyl group, a methoxy group, a methoxycarbonyl group, a cyano group, a fluorine atom or a chlorine atom, more preferably a hydrogen atom, a methyl group, a methoxycarbonyl group, a fluorine atom or a chlorine atom, and particularly preferably a hydrogen atom or a methyl group.

Y represents a single bond, *—COO—**, *—CONH—** or *—O—** and, is preferably a single bond, *—COO—**, or *—CONH—**, more preferably a single bond or *—COO—**, and particularly preferably *—COO—**. * denotes the position bonded to $=C(R^1)$— and ** denotes the position bonded to L.

L represents a divalent linking chain. Specific examples thereof include a substituted or unsubstituted alkylene group, a substituted or unsubstituted arylene group, a substituted or unsubstituted alkylene group having in the inside thereof a linking group (e.g., ether, ester, amido), and a substituted or unsubstituted arylene group having in the inside thereof a linking group. Among these, preferred are a substituted or unsubstituted alkylene group, a substituted or unsubstituted arylene group, and an alkylene group having in the inside thereof a linking group, more preferred are an unsubstituted alkylene group, an unsubstituted arylene group and an alkylene group having in the inside thereof an ether or ester linking group, and particularly preferred are an unsubstituted alkylene group and an alkylene group having in the inside thereof an ether or ester linking group. Examples of the substituent include a halogen, a hydroxyl group, a mercapto group, a carboxyl group, an epoxy group, an allyl group, and an aryl group. These substituents each may be further substituted.

l represents a number satisfying the mathematical formula: l=100−m, and m represents a number of 0 to 50. m is more preferably a number of 0 to 40, and particularly preferably a number of 0 to 30.

$R_3$ to $R_6$ are each preferably a halogen atom, a hydroxyl group, an unsubstituted alkoxy group, or an unsubstituted alkyl group. $R_3$ to $R_5$ are each more preferably a chlorine atom, a hydroxyl group or an unsubstituted alkoxy group having 1 to 6 carbon atoms, even more preferably a hydroxyl group or an alkoxy group having 1 to 3 carbon atoms, and particularly preferably a hydroxyl group or a methoxy group.

$R_6$ represents a hydrogen atom, an alkyl group, an alkoxy group, an alkoxycarbonyl group, a cyano group, a fluorine atom or a chlorine atom. Examples of the alkyl group include a methyl group, and an ethyl group; examples of the alkoxy group include a methoxy group, and an ethoxy group; and examples of the alkoxycarbonyl group include a methoxycarbonyl group, and an ethoxycarbonyl group. $R_6$ is preferably a hydrogen atom, a methyl group, a methoxy group, a methoxycarbonyl group, a cyano group, a fluorine atom or a chlorine atom, more preferably a hydrogen atom, a methyl group, a methoxycarbonyl group, a fluorine atom or a chlorine atom, and particularly preferably a hydrogen atom or a methyl group. $R_7$ has the same meaning as $R_1$ in the general formula 1 and is preferably a hydroxyl group or an unsubstituted alkyl group, more preferably a hydroxyl group or an alkyl group having 1 to 3 carbon atoms, and particularly preferably a hydroxyl group or a methyl group.

Two or more kinds of the compounds represented by the general formula 1 may be used in combination. The compound of the general formula 2 is synthesized using at least two kind of the compound of the general formula 1 as the starting material. Specific examples of the compound represented by the general formula 1 and the starting material for the compound represented by the general formula 2 are set forth below, but the invention is not limited thereto.

[Chem. 2]

M-1

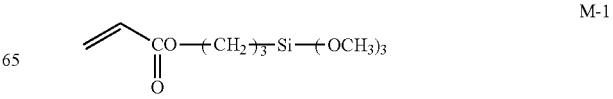

-continued
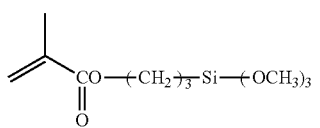
M-2
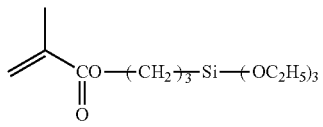
M-3
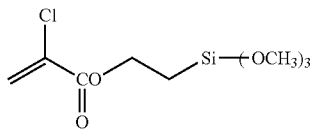
M-4
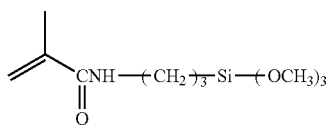
M-5
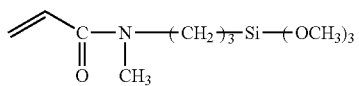
M-6
[Chem. 3]
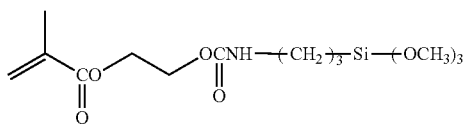
M-7
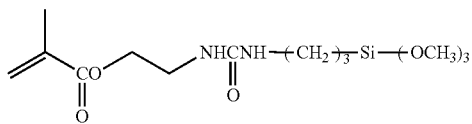
M-8
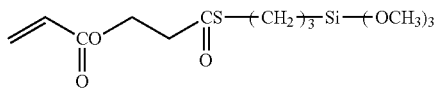
M-9
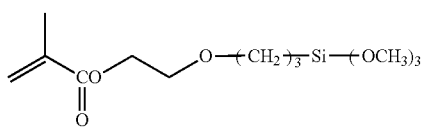
M-10
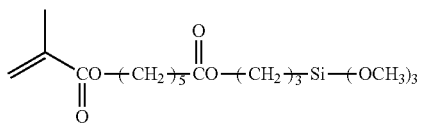
M-11
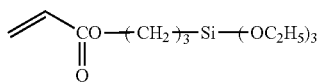
M-12
[Chem. 4]
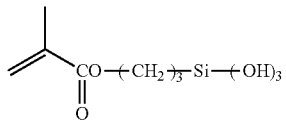
M-13
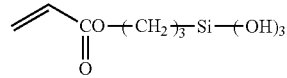
M-14
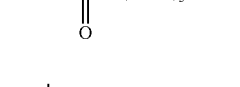
M-15
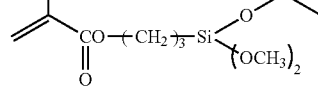
M-16
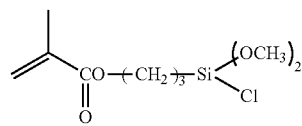
M-17
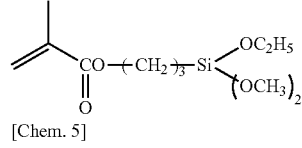
M-18
[Chem. 5]
M-19
M-20
$t\text{-}C_4H_9\text{—}Si\text{—}(OCH_3)_3$
M-21
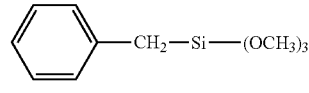
M-22
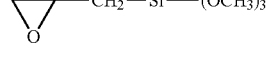
M-23
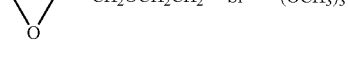
M-24
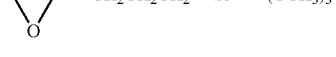
M-25
M-26
[Chem. 6]
M-27
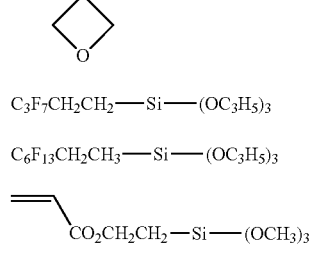
M-28
$C_3F_7CH_2CH_2\text{—}Si\text{—}(OC_3H_5)_3$
M-29
$C_6F_{13}CH_2CH_3\text{—}Si\text{—}(OC_3H_5)_3$
M-30
M-31

-continued

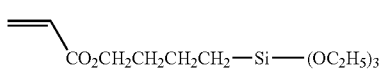

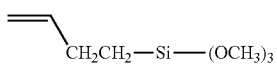

[Chem. 7]

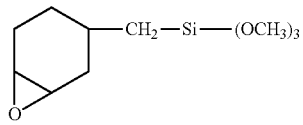

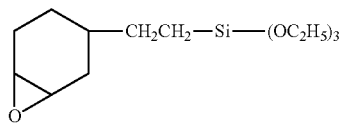

NH₃CH₂CH₂CH₃—Si—(OCH₃)₃

HS—CH₂CH₂CH₂—Si—(OCH₂)₃

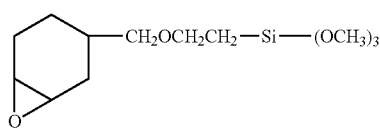

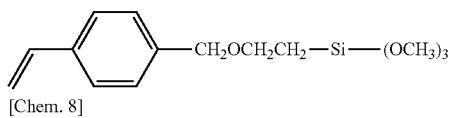

[Chem. 8]

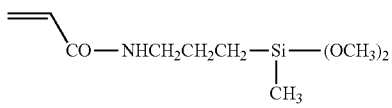

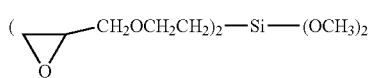

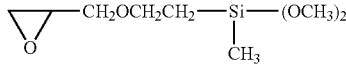

CH₃=CH—Si—(OCH₃)₃

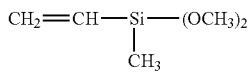

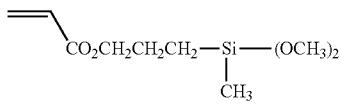

Methyltrimethoxysilane

Among these, (M-1), (M-2), and (M-25) are particularly preferred as the organosilane containing a polymerizable group.

In order to obtain the effect of the invention, the content of the vinyl polymerizable group-containing organosilane in at least one of the hydrolysate of organosilane and the partial condensate thereof is preferably from 30% by mass to 100% by mass, more preferably from 50% by mass to 100% by mass, and particularly preferably from 70% by mass to 95% by mass. When the content of the vinyl polymerizable group-containing organosilane is less than 30% by mass, solid materials are generated, the liquid is clouded, the pot life is worsened, or the molecular weight is difficult to control (increase in the molecular weight), or when a polymerization treatment is performed, the performance (for example, scratch resistance of the antireflection film) can be barely enhanced due to low content of the polymerizable group. In the case of synthesizing the compound represented by the general formula 2, one vinyl polymerizable group-containing organosilane selected from (M-1) and (M-2) and one vinyl polymerizable group-free organosilane selected from (M-19) to (M-21) and (M-48) are preferably used in combination each in the above-described amount.

At least one of the hydrolysate of organosilane and the partial condensate thereof (sometimes referred to as a "sol component") of the invention is preferably reduced in volatility so as to stabilize the performance of the coated product. Specifically, the volatilization volume per hour at 105° C. is preferably 5% by mass or less, more preferably 3% by mass or less, and particularly preferably 1% by mass or less.

The content of the vinyl polymerizable group-containing organosilane in at least one of the hydrolysate of organosilane and the partial condensate thereof is preferably from 30% by mass to 100% by mass, more preferably from 50% by mass to 100% by mass, and particularly preferably from 70% by mass to 100% by mass. When the content of the vinyl polymerizable group-containing organosilane is less than 30% by mass, solid materials are generated, the liquid is clouded, the pot life is worsened, or the molecular weight is difficult to control (increase in the molecular weight), or when a polymerization treatment is performed, the performance (for example, scratch resistance of the antireflection film) can be barely enhanced due to low content of the polymerizable group.

The sol component used in the invention is prepared by the hydrolysis and/or the partial condensation of the above-described organosilane.

The hydrolysis and condensation reaction is performed by adding water in an amount of 0.05 to 2.0 mol, and preferably from 0.1 to 1.0 mol, per mol of the hydrolyzable group (X) and stirring the resulting solution at 25 to 100° C. in the presence of a catalyst used in the invention.

In at least one of the hydrolysate of organosilane and the partial condensate thereof preferably used in the invention, either the hydrolysate of the vinyl polymerizable group-containing organosilane or the partial condensate thereof preferably has a weight average molecular weight of 450 to 20000, more preferably from 500 to 10000, even more preferably from 550 to 5000, and yet even more preferably from 600 to 3000, excluding the components having a molecular weight of less than 300.

Among the components having a molecular weight of 300 or more in the hydrolysate of organosilane and/or the partial condensate thereof, the content of the components having a molecular weight of more than 20000 is preferably 10% by mass or less, more preferably 5% by mass or less, even more preferably 3% by mass or less. When the content of these components is more than 10% by mass, the cured film obtained by curing a curable composition containing such a hydrolysate of organosilane and/or a partial condensate thereof may be deteriorated in the transparency or adhesion to the substrate in some cases.

Here, the weight average molecular weight and the molecular weight are a molecular weight determined by differential refractometer detection with tetrahydrofuran (THF) as a solvent in a GPC analyzer using a column of TSKgel GMHxL, TSKgel G4000HxL, or TSKgel G2000HxL (trade names, all manufactured by Tosoh Corp.) and expressed in terms of polystyrene. The content is an area % of the peaks in the above-described molecular weight range, assuming that the peak area of the components having a molecular weight of 300 or more is 100%.

The dispersity (weight average molecular weight/number average molecular weight) is preferably from 3.0 to 1.1, more preferably from 2.5 to 1.1, even more preferably from 2.0 to 1.1, and particularly preferably from 1.5 to 1.1.

The state of X in the general formula 1 being condensed in the form of —OSi can be confirmed by the $^{29}$Si-NMR analysis of the hydrolysate of organosilane or the partial condensate thereof preferably used in the invention.

At this time, assuming that the case where three bonds of Si are condensed in the form of —OSi is ($T_3$), the case where two bonds of Si are condensed in the form of —OSi is ($T_2$), the case where one bond of Si is condensed in the form of —OSi is ($T_1$) and the case where Si is not condensed at all is ($T_0$), the condensation rate α is represented by the mathematical formula (II): $\alpha=(T_3D_3+T_2D_2+T_1D_1)/3/(T_3+T_2+T_1+T_0)$. The condensation rate is preferably from 0.2 to 0.95, more preferably from 0.3 to 0.93, and particularly preferably from 0.4 to 0.9.

When the condensation rate is less than 0.1, the hydrolysis or condensation proceeds insufficiently to increase the amount of the monomer component and cause insufficient curing, and when it is more than 0.95, the hydrolysis or condensation excessively proceeds and the hydrolyzable group is consumed out, and as a result, the interaction of the binder polymer, the resin substrate, the inorganic fine particle, and the like is reduced and the effect obtainable by their use is not easily exerted.

The hydrolysate of the organosilane compound and the partial condensate thereof used in the invention will be described in detail below.

The hydrolysis reaction of organosilane and the subsequent condensation reaction are generally performed in the presence of a catalyst. Examples of the catalyst include inorganic acids such as hydrochloric acid, sulfuric acid and nitric acid; organic acids such as oxalic acid, acetic acid, butyric acid, maleic acid, citric acid, formic acid, methanesulfonic acid, and toluenesulfonic acid; inorganic bases such as sodium hydroxide, potassium hydroxide, and ammonia; organic bases such as triethylamine and pyridine; metal alkoxides such as triisopropoxy aluminum, tetrabutoxy zirconium, tetrabutyl titanate, and dibutyltin dilaurate; metal chelate compounds with the center metal being a metal such as Zr, Ti, and Al; and F-containing compounds such as KF and $NH_4F$.

These catalysts may be used alone or in combination of plural kinds thereof.

The hydrolysis and condensation reaction of organosilane may be performed without a solvent or in a solvent, but in order to uniformly mix the components, an organic solvent is preferably used. Suitable examples thereof include alcohols, aromatic hydrocarbons, ethers, ketones, and esters.

The solvent is preferably a solvent capable of dissolving the organosilane and the catalyst. In view of the process, the organic solvent is preferably used as a part of the coating solution. The solvent is also preferably a solvent which does not impair the solubility or dispersibility when mixed with other materials such as a fluorine-containing copolymer.

Among these, examples of the alcohols include a monohydric alcohol and a dihydric alcohol, and the monohydric alcohol is preferably a saturated aliphatic alcohol 1 to 8 carbon atoms.

Specific examples of the alcohols include methanol, ethanol, n-propyl alcohol, i-propyl alcohol, n-butyl alcohol, sec-butyl alcohol, tert-butyl alcohol, ethylene glycol, diethylene glycol, triethylene glycol, ethylene glycol monobutyl ether, and ethylene glycol monoethyl ether acetate.

Furthermore, specific examples of the aromatic hydrocarbons include benzene, toluene, and xylene; specific examples of the ethers include tetrahydrofuran, and dioxane; specific examples of the ketones include acetone, methyl ethyl ketone, methyl isobutyl ketone, diisobutyl ketone, and cyclohexanone; and specific examples of the esters include ethyl acetate, propyl acetate, butyl acetate, and propylene carbonate.

One of these organic solvents may be used alone or two or more kinds thereof may be mixed and used. The concentration of the solid contents in the reaction is not particularly limited but is usually in the range of 1% to 100%.

The hydrolysis and condensation reaction of organosilane is performed by adding water in an amount of 0.05 to 2 mol, and preferably from 0.1 to 1 mol, per mol of the hydrolyzable group of organosilane, and stirring the resulting solution at 25 to 100° C. in the presence or absence of the above-described solvent and in the presence of the catalyst.

In the invention, the hydrolysis is preferably performed by stirring the solution at 25 to 100° C. in the presence of at least one metal chelate compound where an alcohol represented by a general formula $R^3OH$ (wherein $R^3$ represents an alkyl group having 1 to 10 carbon atoms) and a compound represented by a general formula $R^4COCH_2COR^5$ (wherein $R^4$ represents an alkyl group having 1 to 10 carbon atoms, and $R^5$ represents an alkyl group having 1 to 10 carbon atoms or an alkoxy group having 1 to 10 carbon atoms) are present as ligands and the center metal is a metal selected from Zr, Ti, and Al.

Alternatively, in the case of using a F-containing compound as the catalyst, the F-containing compound has an ability of allowing the progress of complete hydrolysis and condensation and this is advantageous in that the polymerization degree can be determined by selecting the amount of water added and an arbitrary molecular weight can be designed. That is, in order to prepare an organosilane hydrolysate/partial condensate having an average polymerization degree of M, this may be attained by using water in an amount of (M-1) mol per M mol of the hydrolyzable organosilane.

Any metal chelate compound may be suitably used without particular limitation as long as it is a metal chelate compound where an alcohol represented by the general formula $R^3OH$ (wherein $R^3$ represents an alkyl group having 1 to 10 carbon atoms) and a compound represented by the general formula $R^4COCH_2COR^5$ (wherein $R^4$ represents an alkyl group having 1 to 10 carbon atoms, and $R^5$ represents an alkyl group having 1 to 10 carbon atoms or an alkoxy group having 1 to 10 carbon atoms) are present as ligands and the center metal is a metal selected from Zr, Ti, and Al. Within this category, two or more kinds of metal chelate compounds may be used in combination. The metal chelate compound used in the invention is preferably selected from the group consisting of compounds represented by the general formulae $Zr(OR^3)_{p1}(R^4COCHCOR^5)_{p2}$, $Ti(OR^3)_{q1}(R^4COCHCOR^5)_{q2}$, and Al(OR$_3$)$_{r1}$(R$^4$COCHCOR$^5$)$_{r2}$, and these compounds have an action of accelerating the condensation reaction of the hydrolysate of the organosilane compound and the partial condensate thereof.

In the metal chelate compounds, R$^3$ and R$^4$ may be the same as or different from each other and each represent an alkyl group having 1 to 10 carbon atoms, specifically, an ethyl group, an n-propyl group, an i-propyl group, an n-butyl group, an sec-butyl group, a t-butyl group or an n-pentyl group. R$^5$ represents an alkyl group having 1 to 10 carbon atoms as described above or an alkoxy group having 1 to 10 carbon atoms, such as a methoxy group, an ethoxy group, an n-propoxy group, an i-propoxy group, and n-butoxy group, a sec-butoxy group, and a t-butoxy group. In the metal chelate compounds, p1, p2, q1, q2, r1, and r2 each represent an integer determined to satisfy the relationships of p1+p2=4, q1+q2=4, and r1+r2=3.

Specific examples of the metal chelate compound include zirconium chelate compounds such as zirconium tri-n-butoxyethylacetoacetate, zirconium di-n-butoxybis(ethylacetoacetate), zirconium n-butoxytris(ethylacetoacetate), zirconium tetrakis(n-propylacetoacetate), zirconium tetrakis (acetylacetoacetate), and zirconium tetrakis (ethylacetoacetate); titanium chelate compounds such as titanium diisopropoxy.bis(ethylacetoacetate), titanium diisopropoxy.bis(acetylacetate), and titanium diisopropoxy.bis (acetylacetone); and aluminum chelate compounds such as aluminum diisopropoxyethylacetoacetate, aluminum diisopropoxyacetylacetonate, aluminum isopropoxybis(ethylacetoacetate), aluminum isopropoxybis(acetylacetonate), aluminum tris(ethylacetoacetate), aluminum tris (acetylacetonate), and aluminum monoacetylacetonate.bis (ethylacetoacetate).

Among these metal chelate compounds, preferred are zirconium tri-n-butoxyethylacetoacetate, titanium diisopropoxybis(acetylacetonate), aluminum diisopropoxyethylacetoacetate and aluminum tris(ethylacetoacetate). One of these metal chelate compounds may be used alone, or two or more kinds thereof may be mixed and used. A partial hydrolysate of such a metal chelate compound may also be used.

The metal chelate compound is preferably used in a proportion of 0.01 to 50% by mass, more preferably from 0.1 to 50% by mass, and even more preferably from 0.5 to 10% by mass, based on the organosilane compound. When the metal chelate compound is used in this range, the condensation reaction of the organosilane compound proceeds at a high rate, the coating film can have good durability, and the composition comprising the hydrolysate of the organosilane compound, the partial condensate thereof and the metal chelate compound is assured of good storage stability.

In the coating liquid used in the invention, at least one of a β-diketone compound and a β-ketoester compound is preferably added in addition to the composition containing the above-described sol component and metal chelate compound. This will be further described below.

The compound used in the invention is at least either a β-diketone compound or a β-ketoester compound, represented by the formula: R$^4$COCH$_2$COR$^5$, and this compound functions as a stability enhancer for the composition used in the invention. That is, this compound is considered to coordinate to a metal atom in the metal chelate compound (at least any one compound of zirconium, titanium and aluminum compounds) and inhibit the metal chelate compound from exerting the activity of accelerating the condensation reaction of the hydrolysate of the organosilane compound and the partial condensate thereof, thereby acting to enhance the storage stability of the composition obtained. R$^4$ and R$^5$ constituting the β-diketone compound and β-ketoester compound have the same meanings as R$^4$ and R$^5$ constituting the metal chelate compound above.

Specific examples of the β-diketone compound and β-ketoester compound include acetylacetone, methyl acetoacetate, ethyl acetoacetate, n-propyl acetoacetate, i-propyl acetoacetate, n-butyl acetoacetate, sec-butyl acetoacetate, t-butyl acetoacetate, 2,4-hexane-dione, 2,4-heptane-dione, 3,5-heptane-dione, 2,4-octane-dione, 2,4-nonane-dione, and 5-methyl-hexane-dione. Among these, ethyl acetoacetate and acetylacetone are preferred, and acetylacetone is particularly preferred. Among these, the β-diketone compounds and the β-ketoester compounds may be used alone, or two or more kinds thereof may be mixed and used. In the invention, the β-diketone compound and the β-ketoester compound each is preferably used in an amount of 2 mol or more, more preferably from 3 to 20 mol, per mol of the metal chelate compound. When the amount of the compound is less than 2 mol, the storage stability of the composition obtained may be deteriorated, which is thus not preferred.

The content of the hydrolysate of the organosilane compound or the partial condensate thereof is preferably small in the case of the low refractive index layer which is a relatively thin film, and preferably large in the case of the antiglare layer which is a thick film. Considering the expression of effect, refractive index, the shape/surface state of film, or the like, the content is preferably from 0.1 to 50% by mass, more preferably from 0.5 to 30% by mass, and most preferably from 1 to 15% by mass, based on the entire solid content of the layer containing the hydrolysate or the partial condensate thereof (the layer to which the hydrolysate or the partial condensate thereof is added).

1-(5) Initiator

The polymerization of monomers having various ethylenically unsaturated groups may be performed by the irradiation of ionizing radiation or under heating, in the presence of a photoradical initiator or a thermal radical initiator.

It can be used for preparing the film of the invention, and can be used in combination with a photoinitiator or a thermal initiator.

<Photoinitiator>

Examples of the photoradical polymerization initiator include acetophenones, benzoins, benzophenones, phosphine oxides, ketals, anthraquinones, thioxanthones, azo compounds, peroxides (JP2001-139663A and the like), 2,3-dialkyldione compounds, disulfide compounds, fluoroamine compounds, aromatic sulfoniums, lophine dimers, onium salts, borate salts, active esters, active halogens, inorganic complexes, and coumarins.

Examples of the acetophenones include 2,2-dimethoxyacetophenone, 2,2-diethoxyacetophenone, p-dimethylacetophenone, 1-hydroxy-dimethyl phenyl ketone, 1-hydroxy-dimethyl-p-isopropyl phenyl ketone, 1-hydroxycyclohexyl phenyl ketone, 2-methyl-4-methylthio-2-morpholinopropiophenone, 2-benzyl-2-dimethylamino-1-(4-morpholinophenyl)-butanone, 4-phenoxydichloroacetophenone, and 4-t-butyl-dichloroacetophenone.

Examples of the benzoins include benzoin, benzoin methyl ether, benzoin ethyl ether, benzoin isopropyl ether, benzyl dimethyl ketal, benzoin benzenesulfonic acid ester, benzoin toluenesulfonic acid ester, benzoin methyl ether, benzoin ethyl ether, and benzoin isopropyl ether. Examples of the benzophenones include benzophenone, hydroxybenzophenone, 4-benzoyl-4'-methyldiphenyl sulfide, 2,4-dichlorobenzophenone, 4,4-dichlorobenzophenone, p-chlorobenzophenone, 4,4'-dimethylaminobenzophenone (Michler's ketone), and 3,3',4,4'-tetra(t-butylperoxycarbonyl)benzophenone.

Examples of the borate salts include organoborate salt compounds described in JP2764769B and JP2002-116539A, and Kunz, Martin, et al., "Rad Tech '98, Proceedings April, pp. 19-22, 1998, Chicago". More specifically, examples thereof include compounds described in paragraphs [0022] to [0027] of JP2002-116539A. Other examples of the organoboron compound include organoboron transition metal coordination complexes, described in JP1994-348011A (JP-H06-348011A), JP1995-128785A (JP-H07-128785A), JP1995-140589A (JP-H07-140589A), JP1995-306527A (JP-H07-306527A), and JP1995-292014A (JP-H07-292014A), and specific examples thereof include ion complexes with a cationic colorant.

Examples of the phosphine oxides include 2,4,6-trimethylbenzoyldiphenylphosphine oxide.

Examples of the active esters include 1,2-octanedione, 1-[4-(phenylthio)-,2-(O-benzoyloxime)], sulfonic acid esters, and cyclic active ester compounds.

Specifically, Compounds 1 to 21 described in Examples of JP2000-80068A are particularly preferred. Examples of the onium salts include an aromatic diazonium salt, an aromatic iodonium salt, and an aromatic sulfonium salt.

Specific examples of the active halogens include compounds described in Wakabayashi et al., "Bull Chem. Soc. Japan", Vol. 42, p. 2924 (1969), U.S. Pat. No. 3,905,815B, JP1993-27830A (JP-H05-27830A), and M. P. Hutt, "Journal of Heterocyclic Chemistry", Vol. 1 (No. 3) (1970), and particularly a trihalomethyl group-substituted oxazole compound and an s-triazine compound. Among these, preferred is an s-triazine derivative where at least one mono-, di-, or tri-halogen-substituted methyl group is bonded to the s-triazine ring. Specifically, s-triazine and oxathiazole compounds are known, and examples thereof include 2-(p-methoxyphenyl)-4,6-bis(trichloromethyl)-s-triazine, 2-(p-styrylphenyl)-4,6-bis(trichloromethyl)-s-triazine, 2-(3-Br-4-di(ethyl acetate)amino)phenyl-4,6-bis(trichloromethyl)-s-triazine and 2-trihalomethyl-5-(p-methoxyphenyl)-1,3,4-oxadiazole. Specifically, compounds described on pp. 14-30 of JP1983-15503A (JP-S58-15503A) and pp. 6-10 of JP1980-77742A (JP-S55-77742A), Compound Nos. 1 to 8 described on p. 287 of JP1985-27673B (JP-S60-27673B), Compound Nos. 1 to 17 described on pp. 443-444 of JP1985-239736A (JP-S60-239736A), Compound Nos. 1 to 19 described in U.S. Pat. No. 4,701,399B, and the like are particularly preferred.

Examples of the inorganic complexes include bis-($\eta^5$-2,4-cyclopentadien-1-yl)-bis(2,6-difluoro-3-(1H-pyrrol-1-yl)-phenyl)titanium.

Examples of the coumarins include 3-ketocoumarin.

These initiators may be used singly or as a mixture.

Various examples are also described in "Saishin UV Koka Gijutsu (Newest UV Curing Technologies)", p. 159, Technical Information Institute Co., Ltd. (1991), and "Kiyomi Kato, Shigaisen Koka System (Ultraviolet Curing System)", pp. 65-148, Sogo Gijutsu Center (1989), and these are useful in the invention.

Preferred examples of a commercially available photoradical polymerization, initiator include KAYACURE (DETX-S, BP-100, BDMK, CTX, BMS, 2-EAQ, ABQ, CPTX, EPD, ITX, QTX, BTC, MCA, and the like)" manufactured by Nippon Kayaku Co., Ltd.; Irgacure (651, 127, 500, 819, 907, F369, 1173, 1870, 2959, 4265, 4263, and the like)" manufactured by Ciba Specialty Chemicals Corp.; and ESACURE (KIP100F, KB1, EB3, BP, X33, KT046, KT37, KIP150, TZT, and the like) manufactured by Sartomer Company Inc.; and a mixture thereof.

The photopolymerization initiator is preferably used in an amount ranging from 0.1 to 15 parts by mass, and more preferably from 1 to 10 parts by mass, based on 100 parts by mass of the polyfunctional monomer.

<Photosensitizer>

In addition to the photopolymerization initiator, a photosensitizer may be used. Specific examples of the photosensitizer include n-butylamine, triethylamine, tri-n-butylphosphine, Michler's ketone, and thioxanthone.

Furthermore, one or more auxiliary agents such as an azide compound, a thiourea compound, and a mercapto compound may be used in combination of one or more kinds thereof.

Examples of the commercially available photosensitizer include KAYACURE (DMBI, EPA) manufactured by Nippon Kayaku Co., Ltd.

<Thermal Initiator>

As for the thermal radical initiator, an organic or inorganic peroxide, an organic azo or diazo compound, or the like may be used.

More specifically, examples of the organic peroxide include benzoyl peroxide, halogen benzoyl peroxide, lauroyl peroxide, acetyl peroxide, dibutyl peroxide, cumene hydroperoxide and butyl hydroperoxide; examples of the inorganic peroxide include hydrogen peroxide, ammonium persulfate and potassium persulfate; examples of the azo compound include 2,2'-azobis(isobutyronitrile), 2,2'-azobis(propionitrile), and 1,1'-azobis(cyclohexanecarbonitrile); and examples of the diazo compound include diazoaminobenzene and p-nitrobenzenediazonium.

1-(6) Crosslinking Compound

In the case where the monomer or polymer binder constituting the invention lacks sufficient curability by itself, the necessary curability can be imparted by blending a crosslinking compound.

For example, when the polymer body contains a hydroxyl group, various amino compounds are preferably used as the curing agent. The amino compound used as the crosslinking compound is, for example, a compound having two or more groups in total of either one or both of a hydroxyalkylamino group and an alkoxyalkylamino group, and specific examples thereof include a melamine-based compound, a urea-based compound, a benzoguanamine-based compound, and a glycoluril-based compound.

The melamine-based compound is generally known as a compound having a skeleton of a nitrogen atom being bonded to the triazine ring, and specific examples thereof include melamine, alkylated melamine, methylol melamine and alkoxylated methyl melamine. A compound having two or more groups in total of either one or both of a methylol group and an alkoxylated methyl group within one molecule is preferred. Specifically, a methylolated melamine obtained by reacting melamine and formaldehyde under basic conditions, an alkoxylated methyl melamine, and a derivative thereof are preferred, and an alkoxylated methyl melamine is more preferred because good storage stability of the curable resin composition and good reactivity are obtained. The methylolated melamine and alkoxylated methyl melamine used as the crosslinking compound are not particularly limited, and various resinous materials obtained by the method described, for example, in "Plastic Zairvo Koza (Plastic Material Course) [8] Urea-Melamine Jushi (Urea-Melamine Resin)", Nikkan Kogyo Shinbun-Sha, can also be used.

Furthermore, examples of the urea-based compound include, in addition to urea, a polymethylolated urea and its derivative such as alkoxylated methylurea and urone ring-containing methylolated urone or alkoxylated methylurone. Also as for the compound such as a urea derivative, various resinous materials described in the publication above can be used.

1-(7) Curing Catalyst

In the film of the invention, a curing catalyst capable of generating a radical or an acid upon irradiation with ionizing radiation or heat can be used as the curing catalyst for accelerating the curing.

<Thermal Acid Generator>

Specific examples of the thermal acid generator include various aliphatic sulfonic acids and salts thereof, various aliphatic carboxylic acids and salts thereof such as citric acid, acetic acid, and maleic acid, various aromatic carboxyl acids such as benzoic acid, and phthalic acid, alkylbenzene sulfonic acid and ammonium salts, amine salts, various metal salts, and phosphoric esters with phosphoric acid or organic acids thereof.

Examples of the commercially available material include Catalyst 4040, Catalyst 4050, Catalyst 600, Catalyst 602, Catalyst 500, and Catalyst 296-9, all manufactured by Nihon Cytec Industries Inc.; NACURE series 155, 1051, 5076, and 4054J, and as the block type thereof, NACURE series 2500, 5225, X49-110, 3525, and 4167, all manufactured by King Industries.

The proportion of the thermal acid generator used is preferably from 0.01 to 10 parts by mass, and more preferably from 0.1 to 5 parts by mass, based on 100 parts by mass of the curable resin composition. When the amount added is in this range, good storage stability of the curable resin composition and good scratch resistance of the coating film are ensured.

<Photosensitive Acid Generator, Photoacid Generator>

In addition, the photoacid generator which can be used as a photopolymerization initiator will be described in detail.

Examples of the acid generator include known compounds such as a photoinitiator for photocationic polymerization, a photo-decoloring agent for colorants, a photo-discoloring agent, and a known acid generator or the like used for a microresist or the like, a known compound, and a mixture thereof. In addition, examples of the acid generator include an organohalogenated compound, a disulfone compound, and an onium compound. Among these, specific examples of the organohalogen compound and the disulfone compound are the same as those described above for the compound capable of generating a radical.

Examples of the photosensitive acid generator include (1) various onium salts such as an iodonium salt, a sulfonium salt, a phosphonium salt, a diazonium salt, an ammonium salt, and a pyridinium salt; (2) sulfone compounds such as β-ketoester and β-sulfonylsulfone, and α-diazo compounds thereof; (3) sulfonic acid esters such as alkylsulfonic acid ester, haloalkylsulfonic acid ester, arylsulfonic acid ester, and iminosulfonate; (4) sulfonimide compounds; and (5)diazomethane compounds.

Examples of the onium compound include a diazonium salt, an ammonium salt, an iminium salt, a phosphonium salt, an iodonium salt, a sulfonium salt, an arsonium salt, and a selenonium salt. Among these, a diazonium salt, an iodonium salt, a sulfonium salt, and an iminium salt are preferred in view of photosensitivity for the initiation of photopolymerization, material stability of the compound, and the like. Examples thereof include compounds described in paragraphs [0058] and [0059] of JP2002-29162A.

The proportion of the photosensitive acid generator used is preferably from 0.01 to 10 parts by mass, and more preferably from 0.1 to 5 parts by mass, based on 100 parts by mass of the curable resin composition.

As for other specific compounds and use methods, those described, for example, in JP2005-43876A can be used.

1-(8) Light-Transmitting Particles

In the film of the invention, particularly, in the antiglare layer or hard coat layer, various light-transmitting particles can be used so as impart an antiglare property (surface scattering property) or internal scattering property.

The light-transmitting particles may be organic particles or inorganic particles. As the particle size fluctuation is smaller, the scattering property fluctuates less and the design of haze value is facilitated more. The light-transmitting particles are suitably a plastic beads, and those having high transparency and having a refractive index of which difference from the binder takes a numerical value described above are particularly preferred.

As the organic particles, polymethyl methacrylate particles (refractive index: 1.49), crosslinked poly(acryl-styrene) copolymer particles (refractive index: 1.54), melamine resin particles (refractive index: 1.57), polycarbonate particles (refractive index: 1.57), polystyrene particles (refractive index: 1.60), crosslinked polystyrene particles (refractive index: 1.61), polyvinyl chloride particles (refractive index: 1.60), benzoguanamine-melamine formaldehyde particles (refractive index: 1.68), or the like are used.

Examples of the inorganic particles include silica particles (refractive index: 1.44), alumina particles (refractive index: 1.63), zirconium oxide particles, titanium dioxide particles, and inorganic particles having hollows or pores.

The shape of the light-transmitting particles that are used may be either truly spherical or amorphous. When the shape is amorphous, the particle diameter is determined as a sphere-equivalent diameter by volume.

Among these, crosslinked polystyrene particles, crosslinked poly((meth)acrylate) particles and crosslinked poly(acryl-styrene) particles are preferred. By adjusting the refractive index of the binder in accordance with the refractive index of the light-transmitting particles selected from those particles, the internal haze, the surface haze, and the centerline average roughness of the invention can be achieved.

Moreover, a combination of a binder (refractive index after curing: from 1.50 to 1.53) comprising a trifunctional or greater (meth)acrylate monomer as a main component and light-transmitting particles comprising a crosslinked poly (meth)acrylate polymer having an acryl content of 50 to 100% by weight is preferred, and a combination of the binder and light-transmitting particles (refractive index: from 1.48 to 1.54) comprising a crosslinked poly((meth)acryl) copolymer is more preferred.

In the invention, the binder (light-transmitting resin) and the light-transmitting particles preferably have a refractive index of from 1.45 to 1.70, more preferably from 1.48 to 1.65. The refractive index may be adjusted to fall in this range by appropriately selecting the kind and amount ratio of the binder and light-transmitting particles. Selection can be easily determined by previously performing an experiment.

In addition, in the invention, the difference of refractive index between the binder and the light-transmitting particles (refractive index of light-transmitting particles-refractive index of binder) is preferably, in terms of the absolute value, from 0.000 to 0.030, more preferably from 0.000 to 0.020, and even more preferably from 0.001 to 0.015. If this difference exceeds 0.030, there arises a problem such as film character burring, reduction of dark-room contrast, and surface clouding.

Here, the refractive index of the binder can be quantitatively evaluated, for example, by directly measuring the refractive index with an Abbe refractometer or by measuring the spectral reflection spectrum or spectral ellipsometry. The refractive index of the light-transmitting particles is determined as follows. The light-transmitting particles are dispersed in an equal amount in solvents prepared by changing the mixing ratio of two kinds of solvents differing in the refractive index and thereby varying the refractive index, the turbidity is measured, and the refractive index of the solvent when the turbidity becomes minimum is measured by an Abbe refractometer.

In the case of the above-described light-transmitting particles, the light-transmitting particles are liable to precipitate in the binder and therefore, an inorganic filler such as silica may be added to prevent precipitation. The inorganic filler added in a larger amount is more effective to prevent precipitation of the light-transmitting particles, but this adversely affects the transparency of the coating film. Therefore, an inorganic filler having a particle diameter of 0.5 μm or less is preferably added in an amount on the order of less than about 0.1% by mass to the binder to an extent of not impairing the transparency of the coating film.

Moreover, two or more kinds of light-transmitting particles differing in the particle diameter may be used in combination. The light-transmitting particles having a larger particle diameter can impart an antiglare property and the light-transmitting particles having a smaller particle diameter can reduce the roughened texture on the surface.

The light-transmitting particles are blended to account for 3 to 30% by mass, and preferably from 5 to 20% by mass, in the entire solid content of the layer to which the light-transmitting particles are added. If the proportion is less than 3% by mass, the addition effect is insufficient, whereas if it exceeds 30% by mass, a problem such as image blurring or surface clouding and glaring arises.

Furthermore, the density of the light-transmitting particles is preferably from 10 to 1000 mg/m$^2$, and more preferably from 100 to 700 mg/m$^2$.

<Preparation and Classification of Light-Transmitting Particles>

Examples of the production method of the light-transmitting particles used in the invention include a suspension polymerization method, an emulsion polymerization method, a soap-free emulsion polymerization method, a dispersion polymerization method, and a seed polymerization method, and any of these production methods may be employed. These methods may be performed by referring to the methods described, for example, in Takayuki Ohtsu and Masaetsu Kinoshita, "Kobunshi Gosei no Jikken Ho (Experimental Technique for the Synthesis of Polymers)", pp. 130 and pp. 146 to 147, Kagaku Dojin Sha, Gosei Kobunshi (Synthetic Polymers), Vol. 1, pp. 246-290, ibid., Vol. 3, pp. 1-108, JP2543503B, JP3508304B, JP2746275B, JP3521560B, and JP3580320B, JP1998-1561A (JP-H10-1561A), JP1995-2908A (JP-H07-2908A), JP1993-297506A (JP-H05-297506A), and JP2002-145919A.

As for the particle size distribution of the light-transmitting particles, monodisperse particles are preferred in view of the control of haze value and a diffusing property and the homogeneity of a coated surface state. For example, when a particle having a particle diameter 20% or more larger than the average particle diameter is defined as a coarse particle, the percentage by number of this coarse particles in all particles is preferably 1% or less, more preferably 0.1% or less, even more preferably 0.01% or less. For obtaining particles having such a particle size distribution, classification after production or synthesis reaction is effective and by increasing the number of classifications or elevating the level of classification, a particles having a preferred distribution can be obtained.

The classification is preferably performed using a method such as air classification, centrifugal classification, precipitation classification, filtration classification, and electrostatic classification.

1-(9) Inorganic Particles

In the invention, various inorganic particles can be used for enhancing physical characteristics such as hardness, or optical characteristics such as reflectance and scattering.

The inorganic particles comprise an oxide of at least one metal selected from silicon, zirconium, titanium, aluminum, indium, zinc, tin and antimony. Specific examples thereof include $ZrO_2$, $TiO_2$, $Al_2O_3$, $In_2O_3$, $ZnO$, $SnO_2$, $Sb_2O_3$, and ITO. Other examples include $BaSO_4$, $CaCO_3$, talc, and kaolinite.

The inorganic particles used in the invention are preferably dispersed in a dispersion medium to have a particle diameter as small as possible. The mass average diameter is from 1 to 200 nm, preferably from 5 to 150 nm, more preferably from 10 to 100 nm, and particularly preferably from 10 to 80 nm. By finely dispersing the inorganic particle to 100 nm or less, a film of which transparency is not impaired can be formed. The particle diameter of the inorganic particles can be measured by a light-scattering method or an electron micrograph.

The specific surface area of the inorganic particles is preferably from 10 to 400 m$^2$/g, more preferably from 20 to 200 m$^2$/g, and most preferably from 30 to 150 m$^2$/g.

The inorganic particles used in the invention are preferably dispersed in a dispersion medium and added as a dispersion to the coating solution for the layer in which the inorganic particles are used.

The dispersion medium for the inorganic particles is preferably a liquid having a boiling point of 60 to 170° C. Examples of the dispersion medium include water, an alcohol (e.g., methanol, ethanol, isopropanol, butanol, and benzyl alcohol), a ketone (e.g., acetone, methyl ethyl ketone, methyl isobutyl ketone, and cyclohexanone), an ester (e.g., methyl acetate, ethyl acetate, propyl acetate, butyl acetate, methyl formate, ethyl formate, propyl formate, and butyl formate), an aliphatic hydrocarbon (e.g., hexane and cyclohexane), a halogenated hydrocarbon (e.g., methylene chloride, chloroform, and carbon tetrachloride), an aromatic hydrocarbon (e.g., benzene, toluene, and xylene), an amide (e.g., dimethylformamide, dimethylacetamide, and n-methylpyrrolidone), an ether (e.g., diethyl ether, dioxane, and tetrahydrofuran), and an ether alcohol (e.g., 1-methoxy-2-propanol). Among these, toluene, xylene, methyl ethyl ketone, methyl isobutyl ketone, cyclohexanone, and butanol are particularly preferred.

The dispersion medium is particularly preferably methyl ethyl ketone, methyl isobutyl ketone, or cyclohexanone.

The inorganic particles are dispersed by using a disperser. Examples of the disperser include a sand grinder mill (e.g., bead mill with pin), a high-speed impeller mill, a pebble mill, a roller mill, an attritor and a colloid mill. A sand grinder mill and a high-speed impeller mill are particularly preferred. In addition, a preliminary dispersion treatment may be performed. Examples of the disperser for use in the preliminary dispersion treatment include a ball mill, a three-roll mill, a kneader, and an extruder.

<High Refractive Index Particles>

For the purpose of elevating the refractive index of the layer constituting the invention, a cured product of a composition prepared by dispersing high refractive index inorganic particles in a monomer, an initiator and an organic substituted silicon compound is preferably used.

From a viewpoint of the refractive index, the inorganic particles used here are preferably $ZrO_2$ or $TiO_2$. $ZrO_2$ fine particles are most preferred for elevating the refractive index of the hard coat layer, and $TiO_2$ fine particles are most preferred as particles for the high refractive index layer and the medium refractive index layer.

The $TiO_2$ particles are preferably inorganic particles comprising $TiO_2$ as a main component and containing at least one element selected from cobalt, aluminum, and zirconium. The "main component" means a component of which content (% by mass) is largest among the components constituting the particle.

The particles having $TiO_2$ as a main component in the invention preferably have a refractive index of 1.90 to 2.80, more preferably from 2.10 to 2.80, and most preferably from 2.20 to 2.80.

The mass average primary particle diameter of the particles comprising $TiO_2$ as a main component is preferably from 1 to 200 nm, more preferably from 1 to 150 nm, even more preferably from 1 to 100 nm, and particularly preferably from 1 to 80 nm.

As for the crystal structure of the particles including $TiO_2$ as a main component, the main component is preferably a rutile, rutile/anatase mixed crystal, anatase or amorphous structure, and particularly preferably a rutile structure. The "main component" means a component of which content (% by mass) is largest among the components constituting the particles.

By virtue of incorporating at least one element selected from Co (cobalt), Al (aluminum), and Zr (zirconium) into the particles having $TiO_2$ as a main component, the photocatalytic activity of $TiO_2$ can be suppressed and the weather resistance of the film of the invention can be improved.

The element is particularly preferably Co (cobalt). It is also preferred to use two or more kinds of elements in combination.

The inorganic particles having $TiO_2$ as a main component of the invention may be surface-treated to have a core/shell structure as described in JP2001-166104A.

The addition amount of the monomer or the inorganic particles in the layer is preferably from 10 to 90% by mass, and more preferably from 20 to 80% by mass, based on the total mass of the binder. Two or more kinds of the inorganic particles may be used in the layer.

1-(10) Electrically Conductive Particles

In order to impart electrical conductivity on the invention, various electrically conductive particles may be used.

The electrically conductive particles are preferably formed of a metal oxide or nitride. Examples of the metal oxide or nitride include tin oxide, indium oxide, zinc oxide, and titanium nitride. Among these, tin oxide and indium oxide are particularly preferred. The electrically conductive inorganic particles comprise such a metal oxide or nitride as the main component and may further contain other elements. The main component means a component having a largest content (% by mass) out of the components constituting the particles. Examples of the other element include Ti, Zr, Sn, Sb, Cu, Fe, Mn, Pb, Cd, As, Cr, Hg, Zn, Al, Mg, Si, P, S, B, Nb, In, V, and a halogen atom. In order to raise the electrical conductivity of tin oxide or indium oxide, at least one element selected from Sb, P, B, Nb, In, V, and a halogen atom is preferably added. Sb-containing tin oxide (ATO) and Sb-containing indium oxide (ITO) are particularly preferred. The proportion of Sb in ATO is preferably from 3 to 20% by mass, and the proportion of Sn in ITO is preferably from 5 to 20% by mass.

The average primary particle diameter of the electrically conductive inorganic particles for use in the antistatic layer is preferably from 1 to 150 nm, more preferably from 5 to 100 nm, and most preferably from 5 to 70 nm. The average particle diameter of the electrically conductive inorganic particles in the antistatic layer formed is from 1 to 200 nm, preferably from 5 to 150 nm, more preferably from 10 to 100 nm, and most preferably from 10 to 80 nm. The average particle diameter of the electrically conductive inorganic particles is an average diameter weighed by the mass of the particle and can be measured by a light scattering method or an electron micrograph.

The specific surface area of the electrically conductive inorganic particles is preferably from 10 to 400 $m^2/g$, more preferably from 20 to 200 $m^2/g$, and most preferably from 30 to 150 $m^2/g$.

The electrically conductive inorganic particles may be surface-treated. The surface treatment is performed using an inorganic compound or an organic compound. Examples of the inorganic compound for use in the surface treatment include alumina and silica. A silica treatment is particularly preferred. Examples of the organic compound for use in the surface treatment include a polyol, an alkanolamine, a stearic acid, a silane coupling agent and a titanate coupling agent, with a silane coupling agent being most preferred. Two or more kinds of surface treatments may be performed in combination.

The shape of the electrically conductive inorganic particles is preferably rice grain-like, spherical, cubic, spindle-like, or amorphous.

Two or more kinds of electrically conductive particles may be used in combination in the antistatic layer or as a film.

The proportion of the electrically conductive inorganic particles in the antistatic layer is preferably from 20 to 90% by mass, more preferably from 25 to 85% by mass, and even more preferably from 30 to 80% by mass.

The electrically conductive inorganic particles can be used in a dispersion state for the formation of the antistatic layer.

1-(11) Surface Treating Agent

The inorganic particles used in the invention may be subjected to a physical surface treatment such as a plasma discharge treatment and a corona discharge treatment, or a chemical surface treatment with a surfactant, a coupling agent or the like, so as to stabilize the dispersion in a dispersion product or a coating solution or to enhance the affinity for or binding property with binder components.

The surface treatment can be carried out using a surface treating agent of an inorganic compound or an organic compound. Examples of the inorganic compound for use in the surface treatment include cobalt-containing inorganic compounds ($CoO_2$, $Co_2O_3$, $Co_3O_4$, and the like), aluminum-containing inorganic compounds ($Al_2O_3$, $Al(OH)_3$, and the like), zirconium-containing inorganic compounds ($ZrO_2$, $Zr(OH)_4$, and the like), silicon-containing inorganic compounds ($SiO_2$ and the like), and iron-containing inorganic compounds ($Fe_2O_3$ and the like).

Among these, cobalt-containing inorganic compounds, aluminum-containing inorganic compounds and zirconium-containing inorganic compounds are particularly preferred, and cobalt-containing inorganic compounds, $Al(OH)_3$ and $Zr(OH)_4$ are most preferred.

Examples of the organic compound used in the surface treatment include a polyol, an alkanolamine, a stearic acid, a silane coupling agent, and a titanate coupling agent. Among these, a silane coupling agent is most preferred. In particular, the surface treatment is preferably performed with at least one selected from a silane coupling agent (organosilane compound), and a partially hydrolyzed product and a condensate thereof.

Examples of the titanate coupling agent include metal alkoxides such as tetramethoxy titanium, tetraethoxy titanium, and tetraisopropoxy titanium, and PLENACT (KR-TTS, KR-46B, KR-55, KR-41B, and the like, manufactured by Ajinomoto Co., Inc.), etc.

Preferred examples of the organic compound used for the surface treatment include a polyol, an alkanolamine, and other organic compounds having an anionic group. Among these, more preferred are organic compounds having a carboxyl group, a sulfonic acid group or a phosphoric acid group. Stearic acid, lauric acid, oleic acid, linoleic acid, linolenic acid, and the like are preferably used.

Examples of the crosslinkable or polymerizable functional group include ethylenically unsaturated groups (for example, a (meth)acryloyl group, an allyl group, a styryl group, and a vinyloxy group) capable of an addition reaction/polymerization reaction under the action of a radical species, cationic polymerizable groups (an epoxy group, an oxatanyl group, a vinyloxy group, and the like), and polycondensation reactive groups (a hydrolyzable silyl group, an N-methylol group, and the like). Among these, functional groups having an ethylenically unsaturated group are preferred.

Two or kinds of the surface treatments can be used in combination, and an aluminum-containing inorganic compound and a zirconium-containing inorganic compound are particularly preferably used in combination.

When the inorganic particle is silica, a coupling agent is particularly preferably used. As the coupling agent, an alkoxy metal compound (e.g., a titanium coupling agent and a silane coupling agent) is preferably used. Among these, a silane coupling treatment is particularly effective.

This coupling agent is used as a surface treating agent for previously applying a surface treatment to an inorganic filler of the low refractive index layer before a coating solution for the low refractive index layer is prepared, but the coupling agent is preferably further added as an additive in preparing a coating solution for the low refractive index layer and incorporated into the layer.

The silica fine particles are preferably dispersed in a medium in advance of the surface treatment so as to reduce the load of the surface treatment.

Examples of the surface treating agent and the specific compound of a catalyst for a surface treatment, which can be preferably used in the invention, include the organosilane compound and the catalyst described in WO2004/017105A.

1-(12) Dispersant

Various dispersants can be used for the dispersion of the particles used in the invention.

The dispersant preferably contains a crosslinkable or polymerizable functional group. Examples of the crosslinkable or polymerizable functional group include ethylenically unsaturated groups (for example, a (meth)acryloyl group, an allyl group, a styryl group, and a vinyloxy group) capable of an addition reaction/polymerization reaction under the action of a radical species, cationic polymerizable groups (an epoxy group, an oxatanyl group, a vinyloxy group, and the like), and polycondensation reactive groups (a hydrolyzable silyl group, an N-methylol group, and the like). Among these, functional groups having an ethylenically unsaturated group are preferred.

The dispersant used for dispersing the inorganic particles, particularly for dispersing the inorganic particles having $TiO_2$ as a main component is preferably a dispersant having an anionic group, more preferably a dispersant having an anionic group and a crosslinkable or polymerizable functional group, and particularly preferably a dispersant having the crosslinkable or polymerizable functional group on the side chain.

As the anionic group, a group having an acidic proton, such as a carboxyl group, a sulfonic acid group (sulfo group), a phosphoric acid group (phosphono group), and a sulfonamide group, and salts thereof are effective. Among these, particularly preferred are a carboxyl group, a sulfonic acid group, a phosphonic acid group, and a salt thereof, and more preferred are a carboxyl group and a phosphoric acid group. The number of anionic groups contained per one molecule of the dispersant is, on an average, preferably 2 or more, more preferably 5 or more, and particularly preferably 10 or more. Also, a plural kind of anionic groups may be contained in the dispersant.

In the dispersant having an anionic group on the side chain, the proportion of the anionic group-containing repeating unit is from 10 to 100% by mole, preferably from 1 to 50% by mole, and particularly preferably from 5 to 20% by mole, based on all repeating units.

Examples of the crosslinkable or polymerizable functional group include ethylenically unsaturated groups (for example, a (meth)acryl group, an allyl group, a styryl group, and a vinyloxy group) capable of an addition reaction/polymerization reaction under the action of a radical species, cationic polymerizable groups (an epoxy group, an oxatanyl group, a vinyloxy group, and the like), and polycondensation reactive groups (a hydrolyzable silyl group, an N-methylol group, and the like). Among these, functional groups having an ethylenically unsaturated group are preferred.

The number of crosslinkable or polymerizable functional groups contained per molecule of the dispersant is, on an average, preferably 2 or more, more preferably 5 or more, and particularly preferably 10 or more. Further, a plural kind of crosslinkable or polymerizable functional groups may be contained in one molecule of the dispersant.

Examples of the repeating unit having an ethylenically unsaturated group on the side chain, which can be used in the preferred dispersant used in the invention, include a poly-1,2-butadiene structure, a poly-1,2-isoprene structure, and a (meth)acrylic acid ester or amide repeating unit which is bonded with a specific residue (the R group of —COOR or —CONHR). Examples of the specific residue (R group) include —$(CH_2)_n$—$CR^{21}$=$CR^{22}R^{23}$, —$(CH_2O)_n$—$CH_2CR^{21}$=$CR^{22}R^{23}$, —$(CH_2CH_2O)_n$—$CH_2CR^{21}$=$CR^{22}R^{23}$, —$(CH_2)_n$—NH—CO—O—$CH_2CR^{21}$=$CR^{22}R^{23}$, —$(CH_2)_n$—O—CO—$CR^{21}$=$CR^{22}R^{23}$, and —$(CH_2CH_2O)_2$—X (wherein $R^{21}$ to $R^{23}$ each is a hydrogen atom, a halogen atom, an alkyl group having from 1 to 20 carbon atoms, an aryl group, an alkoxy group or an aryloxy group, $R^{21}$ may be combined with $R^{22}$ or $R^{23}$ to form a ring, n is an integer of 1 to 10, and X is a dicyclopentadienyl residue). Specific examples of the ester residue R include —$CH_2CH$=$CH_2$ (corresponding to a polymer of allyl(meth)acrylate described in JP1989-17047A (JP-S64-17047A), —$CH_2CH_2O$—$CH_2CH$=$CH_2$, —$CH_2CH_2OCOCH$=$CH_2$, —$CH_2CH_2OCOC(CH_3)$=$CH_2$, —$CH_2C(CH_3)$=$CH_2$, —$CH_2CH$=$CH$—$C_6H_5$, —$CH_2CH_2OCOCH$=$CH$—$C_6H_5$, —$CH_2CH_2$—NH-COO—$CH_2CH$=$CH_2$, and —$CH_2CH_2O$—X (wherein X is a dicyclopentadienyl residue). Specific examples of the amide residue R include —$CH_2CH$=$CH_2$, —$CH_2CH_2$—Y (wherein Y is a 1-cyclohexenyl residue), —$CH_2CH_2$—OCO—CH=$CH_2$, and —$CH_2CH_2$—OCO—$C(CH_3)$=$CH_2$.

In the dispersant having an ethylenically unsaturated group, a free radical (a polymerization initiation radical or a radical grown in the polymerization process of a polymerizable compound) is added to the unsaturated bond group to cause an addition polymerization between molecules directly or through chain polymerization of a polymerizable compound, as a result, crosslinks is formed between molecules, thereby completing the curing. Alternatively, an atom in the molecule (for example, a hydrogen atom on a carbon atom adjacent to the unsaturated bond group) is withdrawn by a free radical to produce a polymer radical and the polymer radicals are bonded with each other to form crosslinks between molecules, thereby conducting the curing.

The weight average molecular weight (Mw) of the dispersant having an anionic group and a crosslinkable or polymerizable functional group, and having the crosslinkable or polymerizable functional group on the side chain is not particularly limited, but is preferably 1000 or more. The weight average molecular weight (Mw) of the dispersant is more preferably from 2000 to 1000000, even more preferably from 5000 to 200000, and particularly preferably from 10000 to 100000.

The crosslinkable or polymerizable functional group-containing unit may constitute all repeating units except for the anionic group-containing repeating unit, but the content thereof is preferably from 5 to 50% by mole, and more preferably from 5 to 30% by mole, in all crosslinking or repeating units.

The dispersant may be a copolymer with an appropriate monomer other than the monomer having a crosslinkable or polymerizable functional group and an anionic group. The copolymerization component is not particularly limited but is selected by taking account of various points such as dispersion stability, compatibility with other monomer components, and strength of the film formed. Preferred examples thereof include methyl(meth)acrylate, n-butyl(meth)acrylate, t-butyl(meth)acrylate, and cyclohexyl(meth)acrylate, and styrene.

The dispersant is not particularly limited in the form but is preferably a block copolymer or a random copolymer and in view of cost and easy synthesis, particularly preferably a random copolymer.

The amount of the dispersant used is preferably from 1 to 50% by mass, more preferably from 5 to 30% by mass, and most preferably from 5 to 20% by mass, based on the inorganic particles. Further, two or more kinds of the dispersants may be used in combination.

Specific examples of the dispersant that is preferably used in the invention are shown below, but the dispersant for the invention is not limited thereto. Furthermore, unless otherwise specifically stated, the dispersants are random copolymers.

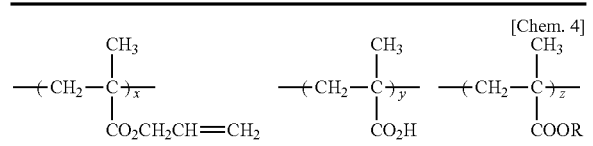

x/y/z represents a molar ratio

| | x | y | z | R | Mw |
|---|---|---|---|---|---|
| P-(1) | 80 | 20 | 0 | — | 40,000 |
| P-(2) | 80 | 20 | 0 | — | 110,000 |
| P-(3) | 80 | 20 | 0 | — | 10,000 |
| P-(4) | 90 | 10 | 0 | — | 40,000 |
| P-(5) | 50 | 50 | 0 | — | 40,000 |
| P-(6) | 30 | 20 | 50 | CH$_2$CH$_2$CH$_3$ | 30,000 |
| P-(7) | 20 | 30 | 50 | CH$_2$CH$_2$CH$_2$CH$_3$ | 50,000 |
| P-(8) | 70 | 20 | 10 | CH(CH$_3$)$_3$ | 60,000 |

-continued

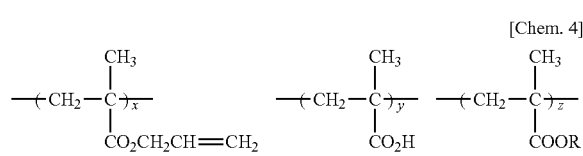

x/y/z represents a molar ratio

| | x | y | z | R | Mw |
|---|---|---|---|---|---|
| P-(9) | 70 | 20 | 10 | —CH$_2$CHCH$_2$CH$_2$CH$_3$<br>                \|<br>                CH$_2$CH$_3$ | 150,000 |
| P-(10) | 40 | 30 | 30 | —CH$_2$—C$_6$H$_5$ | 15,000 |

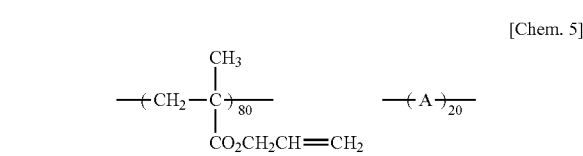

| | A | Mw |
|---|---|---|
| P-(11) | —CH$_2$—CH—<br>        \|<br>       COOH | 20,000 |
| P-(12) | —CH$_2$—CH—<br>        \|<br>       CO$_2$CH$_2$CH$_2$COOH | 30,000 |
| P-(13) | —CH$_2$—CH—(C$_6$H$_4$)—SO$_3$Na | 100,000 |
| P-(14) | —CH$_2$—C(CH$_3$)—CO$_2$CH$_2$CH$_2$SO$_3$H | 20,000 |
| P-(15) | —CH$_2$—C(CH$_3$)—CO$_2$CH$_2$CH$_2$OP(OH)$_2$=O | 50,000 |
| P-(16) | —CH$_2$—CH—CO$_2$CH$_2$CH$_2$O—(CH$_2$)$_5$—OP(OH)$_2$=O | 15,000 |

[Chem. 6]

$$-(A)_{80} \quad -(CH_2-\underset{\underset{COOH}{|}}{\overset{\overset{CH_3}{|}}{C}})_{20}-$$

| | A | Mw |
|---|---|---|
| P-(17) | $-CH_2-\underset{\underset{COOCH_2CH_2OCH=CH}{|}}{\overset{\overset{CH_3}{|}}{C}}-\phantom{XX}(\text{phenyl})$ | 20,000 |
| P-(18) | $-CH_2-CH-\phantom{X}COOCH_2CH_2O\overset{O}{\overset{\|}{C}}CH_2CH=CH_2$ | 25,000 |
| P-(19) | $-CH_2-\underset{\underset{COO-CH_2-(\text{phenyl})-CH=CH_2}{|}}{\overset{\overset{CH_3}{|}}{C}}-$ | 18,000 |
| P-(20) | $-CH_2-CH-(\text{phenyl})-OCH_2CH=CH_2\text{ (via }OC(=O)\text{)}$ | 20,000 |
| P-(21) | $-CH_2-CH-\phantom{X}CONHCH_2CH_2O\overset{O}{\overset{\|}{C}}CH=CH_2$ | 35,000 |

[Chem. 7]

$$-(CH_2-\underset{\underset{COOR^1}{|}}{\overset{\overset{CH_3}{|}}{C}})_x- \quad -(CH_2-\underset{\underset{COOH}{|}}{\overset{\overset{CH_3}{|}}{C}})_y- \quad -(CH_2-\underset{\underset{COOR^2}{|}}{\overset{\overset{CH_3}{|}}{C}})_z-$$

| | R¹ | R² | x | y | z | Mw |
|---|---|---|---|---|---|---|
| P-(22) | $CH_2CH_2O\overset{O}{\overset{\|}{C}}CH=CH_2$ | $C_4H_9(n)$ | 10 | 10 | 80 | 25,000 |
| P-(23) | $CH_2CH_2O\overset{O}{\overset{\|}{C}}CH=CH_2$ | $C_4H_9(t)$ | 10 | 10 | 80 | 25,000 |
| P-(24) | $CH_2CH_2O\overset{O}{\overset{\|}{C}}\underset{CH_3}{C}=CH_2$ | $C_4H_9(n)$ | 10 | 10 | 80 | 500,000 |
| P-(25) | HO-cyclohexyl-CH$_2$OC(=O)CH=CH$_2$ | $C_4H_9(n)$ | 10 | 10 | 80 | 23,000 |
| P-(26) | HO-cyclohexyl-CH$_2$OC(=O)CH=CH$_2$ | $C_4H_9(n)$ | 80 | 10 | 10 | 30,000 |
| P-(27) | HO-cyclohexyl-CH$_2$OC(=O)CH=CH$_2$ | $C_4H_9(n)$ | 50 | 20 | 30 | 30,000 |

-continued

| | | | | | | |
|---|---|---|---|---|---|---|
| P-(28) | HO—[cyclohexane with H]—CH₂OCCH=CH₂ (with C=O) | $C_4H_9(t)$ | 10 | 10 | 80 | 20,000 |
| P-(29) | HO—[cyclohexane with H]—CH₂OCCH=CH₂ (with C=O) | $CH_2CH_2OH$ | 50 | 10 | 40 | 20,000 |
| P-(30) | HO—[cyclohexane with H]—CH₂OCC(CH₃)=CH₂ (with C=O) | $C_4H_9(n)$ | 10 | 10 | 80 | 25,000 |

[Chem. 8]

P-(31) —(CH₂—CH)— with phenyl-OCH₂CHCH₂OOC-(phenyl)-COOH, with OCCH=CH₂ branch    Mw = 60,000

P-(32) —(CH₂—C(CH₃)(CO₂CH₂CH=CH₂))—S—COOH    Mw = 10,000

P-(33) —(CH₂—C(CH₃)(CO₂CH₂CH=CH₂))—S—CH(COOH)CH₂COOH    Mw = 20,000

P-(34) —(CH₂—CH)₈₀— (CO₂CH₂CH=CH₂)    —(CH₂—CH)₂₀— (CO₂CH₂CH₂COOH)    Mw = 30,000 (Block Copolymer)

P-(35) —(CH₂—C(CH₃))₈₀— (CO₂CH₂CH₂OCCH=CH₂)    —(CH₂CH)₂₀— (COOH)    Mw = 15,000 (Block Copolymer)

[Chem. 9]

P-(36) —(CH₂—C(CH₃))₈₀— (CO₂CH₂-epoxide)    —(CH₂—C(CH₃))₂₀— (CO₂H)    Mw = 8,000

P-(37) —(CH₂—C(CH₃))₈₀— (CO₂CH₂CH₂CH₂Si(OCH₂CH₃)₃)    —(CH₂—C(CH₃))₂₀— (COOH)    Mw = 5,000

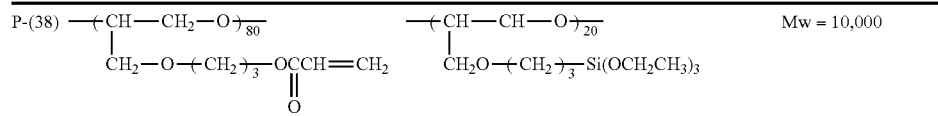

1-(13) Antifouling Agent

For the purpose of imparting characteristics such as an antifouling agent, water resistance, chemical resistance, and slipperiness, it is preferable to appropriately add a known silicon-based or fluorine-based antifouling agent, a slipping agent, or the like to the film of the invention, in particular, an uppermost layer of the film.

In the case of adding such an additive, the additive is preferably added in the range from 0.01 to 20% by mass, more preferably from 0.05 to 10% by mass, and particularly preferably from 0.1 to 5% by mass, based on the entire solid content of the low refractive index layer.

Preferred examples of the silicone-based compound include compounds containing a plurality of dimethyl-silyloxy units as the repeating unit and having a substituent at the chain terminal and/or on the side chain. In the chain of the compound containing dimethylsilyloxy as the repeating unit, a structural unit other than dimethylsilyloxy may be contained. A plurality of substituents, which may be the same as or different from each other, are preferably present. Preferred examples of the substituent include groups containing an acryloyl group, a methacryloyl group, a vinyl group, an aryl group, a cinnamoyl group, an epoxy group, an oxetanyl group, a hydroxyl group, a fluoroalkyl group, a polyoxyalkylene group, a carboxyl group, an amino group, or the like. The molecular weight is not particularly limited but is preferably 100,000 or less, more preferably 50,000 or less, particularly preferably from 3000 to 30,000, and most preferably from 10,000 to 20,000. The silicone atom content of the silicone-based compound is not particularly limited but is preferably 18.0% by mass or more, more preferably from 25.0 to 37.8% by mass, and most preferably from 30.0 to 37.0% by mass. Specific preferred examples of the silicone-based compound include, but are not limited to, X-22-174DX, X-22-2426, X-22-164B, X22-164C, X-22-170DX, X-22-176D, and X-22-1821 (all trade names) manufactured by Shin-Etsu Chemical Co., Ltd., FM-0725, FM-7725, FM-4421, FM-5521, FM6621, and FM-1121 manufactured by Chisso Corporation, and DMS-U22, RMS-033, RMS-083, UMS-182, DMS-H21, DMS-H31, HMS-301, FMS121, FMS123, FMS131, FMS141, and FMS221 (all trade names) manufactured by Gelest.

The fluorine-based compound is preferably a compound having a fluoroalkyl group. The fluoroalkyl group is preferably a fluoroalkyl group having from 1 to 20 carbon atoms, and more preferably from 1 to 10 carbon atoms, and may have a linear structure (for example, $-CF_2CF_3$, $-CH_2(CF_2)_4H$, $-CH_2(CF_2)_8CF_3$, and $-CH_2CH_2(CF_2)_4H$), a branched structure (for example, $CH(CF_3)_2$, $CH_2CF(CF_3)_2$, $CH(CH_3)CF_2CF_3$, and $CH(CH_3)(CF_2)_5CF_2H$), or an alicyclic structure (preferably a 5- or 6-membered ring, for example, a perfluorocyclohexyl group, a perfluorocyclopentyl group, or an alkyl group substituted by such a group), or may have an ether bond (for example, $CH_2OCH_2CF_2CF_3$, $CH_2CH_2OCH_2C_4F_8H$, $CH_2CH_2OCH_2CH_2C_8F_{17}$, and $CH_2CH_2OCF_2CF_2OCF_2CF_2H$). A plurality of the fluoroalkyl groups may be contained within the same molecule.

The fluorine-based compound preferably further has a substituent which contributes to the bond formation or compatibility with the low refractive index layer film. The substituents may be the same as or different from each other, and a plurality of substituents are preferably present. Preferred examples of the substituent include an acryloyl group, a methacryloyl group, a vinyl group, an aryl group, a cinnamoyl group, an epoxy group, an oxetanyl group, a hydroxyl group, a polyoxyalkylene group, a carboxyl group, and an amino group. The fluorine-based compound may be a copolymer or copolymer oligomer with a compound not containing a fluorine atom. The molecular weight is not particularly limited. The fluorine atom content of the fluorine-based compound is not particularly limited, but is preferably 20% by mass or more, more preferably from 30 to 70% by mass, and most preferably from 40 to 70% by mass. Specific preferred examples of the fluorine-based compound include, but are not limited to, R-2020, M-2020, R-3833, and M-3833 (all trade names) manufactured by Daikin Kogyo Co., Ltd., and MEGAFAC F-171, F-172, and F-179A, DYFENSA MCF-300 (all trade names) manufactured by Dai-Nippon Ink & Chemicals, Inc.

For the purpose of imparting properties such as a dust-protecting property and an antistatic property, a dust inhibitor, an antistatic agent, or the like, such as a known cationic surfactant or polyoxyalkylene-based compound, may be appropriately added. A structural unit of such a dust inhibitor or antistatic agent may be contained as a part of functions in the above-described silicone-based compound or fluorine-based compound. In the case of adding such an additive, the additive is preferably added in the range from 0.01 to 20% by mass, more preferably from 0.05 to 10% by mass, and particularly preferably from 0.1 to 5% by mass, based on the entire solid content of the lower refractive index layer. Preferred examples of the compound include, but are not limited to, MEGAFAC F-150 (trade name) manufactured by Dai-Nippon Ink & Chemicals, Inc.), and SH-3748 (trade name) manufactured by Toray Dow Corning.

1-(14) Surfactant

In the film of the invention, the coating composition for forming the light-diffusing layer preferably contains either one or both of a fluorine-containing surfactant and a silicone-containing surfactant particularly for ensuring the surface uniformity free of coating unevenness, drying unevenness, point defects, or the like. Among these, a fluorine-containing surfactant can be preferably used, because the effect of improving surface failures such as coating unevenness, drying unevenness, and point defects can be brought out with a smaller amount of the surfactant added. Suitability for high-speed coating can be imparted while enhancing the surface uniformity, whereby the productivity can be elevated.

Preferred examples of the fluorine-based surfactant include a fluoro-aliphatic group-containing copolymer (sometimes simply referred to as a "fluorine-based polymer"). As the fluorine-based polymer, a copolymer of an acrylic or methacrylic resin comprising a repeating unit corresponding to the monomer of (i) below or comprising a repeating unit corresponding to the monomer of (ii) below, and a vinyl-based monomer copolymerizable therewith is useful.

(i) Fluoro-aliphatic Group-Containing Monomer Represented by the Following General Formula A:

General Formula A

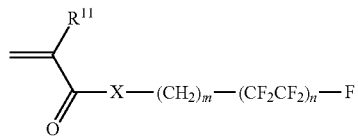

[Chem. 10]

In the general formula A, $R^{11}$ represents a hydrogen atom or a methyl group, X represents an oxygen atom, a sulfur atom, or —N($R^{12}$)—, m represents an integer of 1 or more and 6 or less, and n represents an integer of 2 to 4. $R^{12}$ represents a hydrogen atom or an alkyl group having 1 to 4 carbon atoms, specifically a methyl group, an ethyl group, a propyl group, or a butyl group, and preferably a hydrogen atom or a methyl group. X is preferably an oxygen atom.

(ii) Monomer Represented by the Following General Formula B, which is Copolymerizable with Monomer of (i)

General Formula B

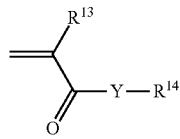

[Chem. 11]

In the general formula B, $R^{13}$ represents a hydrogen atom or a methyl group, and Y represents an oxygen atom, a sulfur atom or —N($R^{15}$)—. $R^{15}$ represents a hydrogen atom or an alkyl group having 1 to 4 carbon atoms, specifically a methyl group, an ethyl group, a propyl group or a butyl group, and preferably a hydrogen atom or a methyl group. Y is preferably an oxygen atom, —N(H)—, or —N($CH_3$)—.

$R^{14}$ represents a linear, branched or cyclic alkyl group having 4 to 20 carbon atoms, which may have a substituent. Examples of the substituent of the alkyl group as $R^{14}$ include, but are not limited to, a hydroxyl group, an alkylcarbonyl group, an arylcarbonyl group, a carboxyl group, an alkyl ether group, an aryl ether group, a halogen atom such as a fluorine atom, a chlorine atom, and a bromine atom, a nitro group, a cyano group, and an amino group. Suitable examples of the linear, branched, or cyclic alkyl group having 4 to 20 carbon atoms include a butyl group, a pentyl group, a hexyl group, a heptyl group, an octyl group, a nonyl group, a decyl group, an undecyl group, a dodecyl group, a tridecyl group, a tetradecyl group, a pentadecyl group, an octadecyl group, and an eicosanyl group, which each may be linear or branched, and further include a monocyclic cycloalkyl group such as a cyclohexyl group, a cycloheptyl group, and the like, and a polycyclic cycloalkyl group such as a bicycloheptyl group, a bicyclodecyl group, a tricycloundecyl group, a tetracyclododecyl group, an adamantyl group, a norbornyl group, and a tetracyclodecyl group.

The amount of the fluoro-aliphatic group-containing monomer represented by the general formula A used in the fluorine-based polymer used in the invention is 10% by mole or more, preferably from 15 to 70% by mole, and more preferably 20 to 60% by mole, based on each monomer of the fluorine-based polymer.

The mass average molecular weight of the fluorine-based polymer used in the invention is preferably from 3,000 to 100,000, and more preferably from 5,000 to 80,000.

Furthermore, the addition amount of the fluorine-based polymer used in the invention is preferably from 0.001 to 5% by mass, more preferably from 0.005 to 3% by mass, and even more preferably from 0.01 to 1% by mass, based on the coating liquid. If the addition amount of the fluorine-based polymer added is less than 0.001% by mass, the effect is insufficient, whereas if it is more than 5% by mass, the coating film may not be satisfactorily dried or the performance (for example, reflectance and scratch resistance) as the coating film may be adversely affected.

Specific structural examples of the fluorine-based polymer constituted with the fluoro-aliphatic group-containing copolymer represented by the general formula A are set forth below, but are limited thereto. Further, the numeral in the formulae indicates the molar ratio of each monomer component and Mw indicates the weight average molecular weight.

[Chem.12]

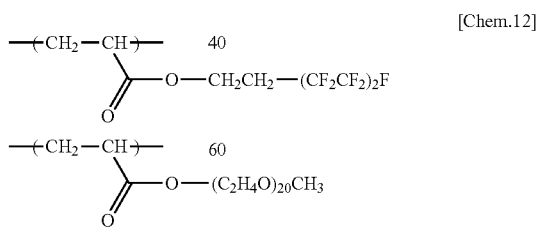

FP-1
Mw 15,000

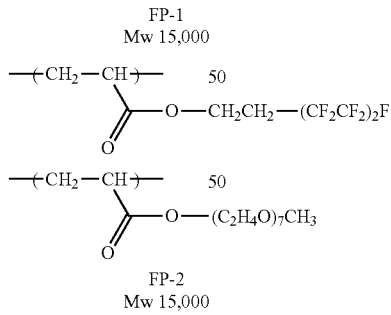

FP-2
Mw 15,000

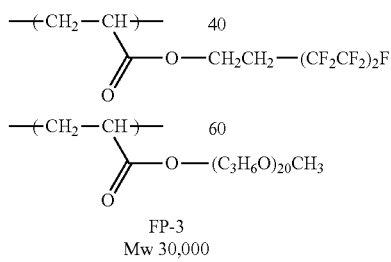

FP-3
Mw 30,000

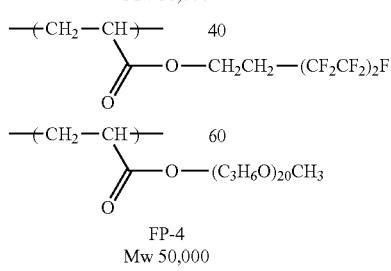

FP-4
Mw 50,000

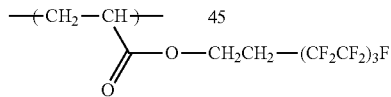

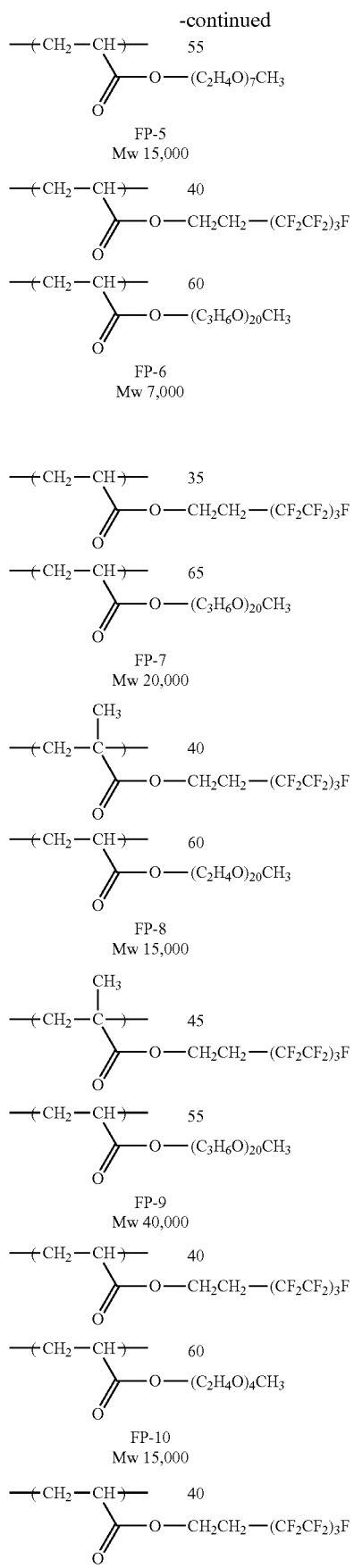

FP-5
Mw 15,000

FP-6
Mw 7,000

FP-7
Mw 20,000

FP-8
Mw 15,000

FP-9
Mw 40,000

FP-10
Mw 15,000

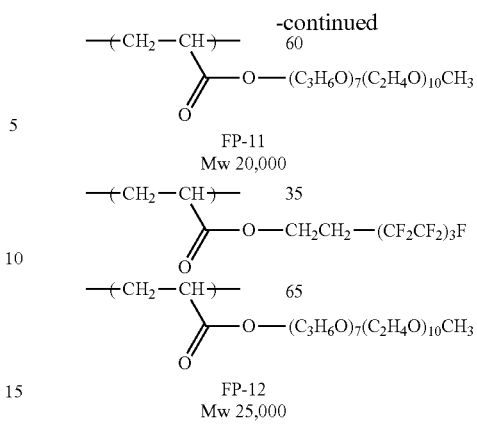

FP-11
Mw 20,000

FP-12
Mw 25,000

However, when the fluorine-based polymer as described above is used, functional groups containing an F atom are segregated on the surface of the antiglare layer whereby surface energy of the antiglare layer lowers and there is resulted a problem that, when a low refractive layer is coated over the aforementioned antiglare layer, its reflection preventing property is deteriorated. That is presumably due to the fact that wetting property of the hardening composition used for the formation of the low refractive layer is deteriorated whereby fine unevenness being unable to be detected with the naked eye in the low refractive layer is deteriorated. In order to solve such a problem, it has been found to be effective that structure and adding amount of the fluorine-based polymer are adjusted so that surface energy of the antiglare layer is controlled preferably to from 20 mN·m$^{-1}$ to 50 mN·m$^{-1}$, and more preferably from 30 mN·m$^{-1}$ to 40 mN·m$^{-1}$. In order to achieve the surface energy as mentioned above, it is necessary that F/C which is a ratio of the peak derived from fluorine atom to the peak derived from carbon atom measured by an X-ray photoelectron spectroscopy is from 0.1 to 1.5.

Alternatively, when a fluorine-based polymer to be extracted with a solvent forming the upper layer is selected in application of an upper layer, it is not segregated on the surface (=interface) of the lower layer and close adhesion of upper and lower layers is achieved so that uniformity of the surface state is maintained even by a high-speed application and, moreover, lowering of surface free energy which is capable of providing an antiglare reflection preventing transparent film having a strong resistance to scratch is prevented whereby it is capable of achieving an object by controlling the surface energy of the antiglare layer before application of the low refractive layer to the aforementioned range. Examples of the material as such are acrylic resin and methacrylic resin which are characterized in containing a repeating unit corresponding to a monomer containing fluoro-aliphatic group represented by the following general formula C and a copolymer of a vinyl-based monomer which is able to be copolymerized therewith.

(iii) Monomer Containing Fluoro-Aliphatic Group Represented by Following General Formula C General Formula C

[Chem. 14]

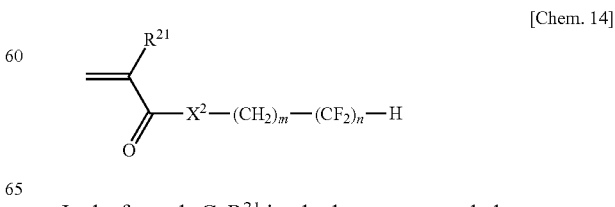

In the formula C, $R^{21}$ is a hydrogen atom, a halogen group, or a methyl group, and more preferably a hydrogen atom or a methyl group; $X^2$ is an oxygen atom, a sulfur atom, or —$N(R^{22})$—, more preferably an oxygen atom or —$N(R^{22})$—, and even more preferably an oxygen atom; m is an integer of 1 to 6 (preferably an integer of 1 to 3, and more preferably an integer of 1); n is an integer of 1 to 18 (preferably an integer of 4 to 12, and more preferably an integer of 6 to 8); $R^{22}$ is a hydrogen atom or an optionally substituted alkyl group having 1 to 8 carbon atoms, preferably a hydrogen atom or an alkyl group having 1 to 4 carbon atoms, and more preferably a hydrogen atom or a methyl group; and X is preferably an oxygen atom.

Moreover, in the fluorine-based polymer, two or more kinds of monomers containing fluoro-aliphatic group represented by the formula C may be included as constituting components.

(iv) Monomer Represented by Following General Formula D which is Able to be Copolymerized with (iii)

General Formula D

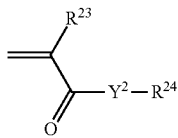

[Chem. 15]

In the general formula D, $R^{23}$ is hydrogen atom, a halogen group, or a methyl group, and more preferably a hydrogen atom or a methyl group; $Y^2$ is an oxygen atom, a sulfur atom, or —$N(R^{25})$—, preferably an oxygen atom or —$N(R^{25})$—, and more preferably an oxygen atom; $R^{25}$ is a hydrogen atom or an alkyl group having 1 to 8 carbon atoms, preferably a hydrogen atom or an alkyl group having 1 to 4 carbon atoms, and more preferably a hydrogen atom or a methyl group.

$R^{24}$ is an optionally substituted linear, branched or cyclic alkyl group having 1 to 20 carbon atoms, an alkyl group containing a poly(alkyleneoxy) group or an optionally substituted aromatic group (such as phenyl group or naphthyl group), preferably a linear, branched or cyclic alkyl group having 1 to 12 carbon atoms or an aromatic group having 6 to 18 carbon atoms in total, and more preferably a linear, branched or cyclic alkyl group having 1 to 8 carbon atoms.

Specific structural examples of the fluorine-based polymer containing a repeating unit corresponding to the monomer containing fluoro-aliphatic group represented by the general formula C are set forth below, but are excluded. Further, the numeral in the formulae indicates the molar ratio of each monomer component and Mw indicates the weight average molecular weight.

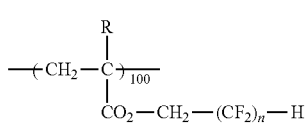

[Chem. 16]

| | R | n | Mw |
|---|---|---|---|
| P-1 | H | 4 | 8000 |
| P-2 | H | 4 | 16000 |
| P-3 | H | 4 | 33000 |
| P-4 | CH₃ | 4 | 12000 |
| P-5 | CH₃ | 4 | 28000 |
| P-6 | H | 6 | 8000 |
| P-7 | H | 6 | 14000 |

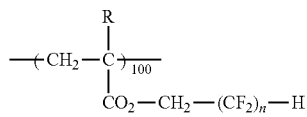

[Chem. 16]

| | R | n | Mw |
|---|---|---|---|
| P-8 | H | 6 | 29000 |
| P-9 | CH₃ | 6 | 10000 |
| P-10 | CH₃ | 6 | 21000 |
| P-11 | H | 8 | 4000 |
| P-12 | H | 8 | 16000 |
| P-13 | H | 8 | 31000 |
| P-14 | CH₃ | 8 | 3000 |

[Chem. 17]

$$-(CH_2-\underset{\underset{CO_2-(CH_2)_p-(CF_2)_q-H}{|}}{\overset{R^1}{C}})_x-(CH_2-\underset{\underset{CO_2-(CH_2)_r-(CF_2)_s-H}{|}}{\overset{R^2}{C}})_{100-x}-$$

| | x | R¹ | p | q | R² | r | s | Mw |
|---|---|---|---|---|---|---|---|---|
| P-15 | 50 | H | 1 | 4 | CH₃ | 1 | 4 | 10000 |
| P-16 | 40 | H | 1 | 4 | H | 1 | 6 | 14000 |
| P-17 | 60 | H | 1 | 4 | CH₃ | 1 | 6 | 21000 |
| P-18 | 10 | H | 1 | 4 | H | 1 | 8 | 11000 |
| P-19 | 40 | H | 1 | 4 | H | 1 | 8 | 16000 |
| P-20 | 20 | H | 1 | 4 | CH₃ | 1 | 8 | 8000 |
| P-21 | 10 | CH₃ | 1 | 4 | CH₃ | 1 | 8 | 7000 |
| P-22 | 50 | H | 1 | 6 | CH₃ | 1 | 6 | 12000 |
| P-23 | 50 | H | 1 | 6 | CH₃ | 1 | 6 | 22000 |
| P-24 | 30 | H | 1 | 6 | CH₃ | 1 | 6 | 5000 |

[Chem. 18]

$$-(CH_2-\underset{\underset{CO_2-CH_2-(CF_2)_n-H}{|}}{\overset{R^1}{C}})_x-(CH_2-\underset{\underset{CO_2-R^3}{|}}{\overset{R^2}{C}})_{100-x}-$$

| | x | R¹ | n | R² | R³ | Mw |
|---|---|---|---|---|---|---|
| FP-148 | 80 | H | 4 | CH₃ | CH₃ | 11000 |
| FP-149 | 90 | H | 4 | H | C₄H₉(n) | 7000 |
| FP-150 | 95 | H | 4 | H | C₆H₁₃(n) | 5000 |
| FP-151 | 90 | CH₃ | 4 | H | CH₂CH(C₂H₅)C₄H₉(n) | 15000 |
| FP-152 | 70 | H | 6 | CH₃ | C₂H₅ | 18000 |
| FP-153 | 90 | H | 6 | CH₃ | 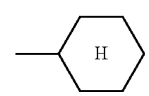 | 12000 |
| FP-154 | 80 | H | 6 | H | C₄H₉(sec) | 9000 |
| FP-155 | 90 | H | 6 | H | C₁₂H₂₅(n) | 21000 |
| FP-156 | 60 | CH₃ | 6 | H | CH₃ | 15000 |
| FP-157 | 60 | H | 8 | H | CH₃ | 10000 |
| FP-158 | 70 | H | 8 | H | C₂H₅ | 24000 |
| FP-159 | 70 | H | 14 | 8 | H | C₄H₉(n) | 5000 |
| FP-160 | 50 | H | 8 | H | C₄H₉(n) | 16000 |
| FP-161 | 80 | H | 8 | CH₃ | C₄H₉(iso) | 13000 |
| FP-162 | 80 | H | 8 | CH₃ | C₄H₉(t) | 9000 |

[Chem. 18]

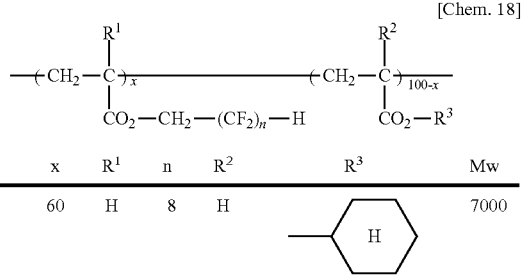

| | x | R¹ | n | R² | R³ | Mw |
|---|---|---|---|---|---|---|
| FP-163 | 60 | H | 8 | H | (cyclohexyl-H) | 7000 |
| FP-164 | 80 | H | 8 | H | $CH_2CH(C_2H_6)C_4H_9(n)$ | 8000 |
| FP-165 | 90 | H | 8 | H | $C_{12}H_{25}(n)$ | 6000 |
| FP-166 | 80 | $CH_3$ | 8 | $CH_3$ | $C_4H_9(sec)$ | 18000 |
| FP-167 | 70 | $CH_3$ | 8 | $CH_3$ | $CH_3$ | 22000 |
| FP-168 | 70 | H | 10 | $CH_3$ | H | 17000 |
| FP-169 | 90 | H | 10 | H | H | 9000 |

[Chem. 19]

| | x | R¹ | n | R² | R³ | Mw |
|---|---|---|---|---|---|---|
| FP-170 | 95 | H | 4 | $CH_3$ | $-(CH_2CH_2O)_2-H$ | 18000 |
| FP-171 | 80 | H | 4 | H | $-(CH_2CH_2O)_2-CH_3$ | 16000 |

[Chem. 19]

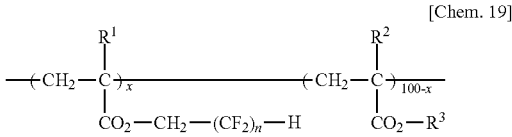

| | x | R¹ | n | R² | R³ | Mw |
|---|---|---|---|---|---|---|
| FP-172 | 80 | H | 4 | H | $-(C_3H_6O)_7-H$ | 24000 |
| FP-173 | 70 | $CH_3$ | 4 | $CH_3$ | $-(C_3H_6O)_{13}-H$ | 18000 |
| FP-174 | 90 | H | 6 | H | $-(CH_2CH_2O)_2-H$ | 21000 |
| FP-175 | 90 | H | 6 | $CH_3$ | $-(CH_2CH_2O)_8-H$ | 9000 |
| FP-176 | 80 | H | 6 | H | $-(CH_2CH_2O)_2-C_4H_9(n)$ | 12000 |
| FP-177 | 80 | H | 6 | H | $-(C_3H_6O)_7-H$ | 34000 |
| FP-178 | 75 | F | 6 | H | $-(C_3H_6O)_{13}-H$ | 11000 |
| FP-179 | 85 | $CH_3$ | 6 | $CH_3$ | $-(C_3H_6O)_{20}-H$ | 18000 |
| FP-180 | 95 | $CH_3$ | 6 | $CH_3$ | $-CH_2CH_2OH$ | 27000 |
| FP-181 | 80 | H | 8 | $CH_3$ | $-(CH_2CH_2O)_9-H$ | 12000 |
| FP-182 | 95 | H | 8 | H | $-(CH_2CH_2O)_9-CH_3$ | 20000 |
| FP-183 | 90 | H | 8 | H | $-(C_3H_6O)_7-H$ | 8000 |
| FP-184 | 95 | H | 8 | H | $-(C_3H_6O)_{20}-H$ | 15000 |
| FP-185 | 90 | F | 8 | H | $-(C_3H_6O)_{13}-H$ | 12000 |
| FP-186 | 80 | H | 8 | $CH_3$ | $-(CH_2CH_2O)_2-H$ | 20000 |
| FP-187 | 95 | $CH_3$ | 8 | H | $-(CH_2CH_2O)_9-CH_3$ | 17000 |
| FP-188 | 90 | $CH_3$ | 8 | H | $-(C_3H_6O)_7-H$ | 34000 |
| FP-189 | 80 | H | 10 | H | $-(CH_2CH_2O)_3-H$ | 19000 |
| FP-190 | 90 | H | 10 | H | $-(C_3H_6O)_7-H$ | 8000 |
| FP-191 | 80 | H | 12 | H | $-(CH_2CH_2O)_7-CH_3$ | 7000 |
| FP-192 | 95 | $CH_3$ | 12 | H | $-(C_3H_6O)_7-H$ | 10000 |

[Chem. 20]

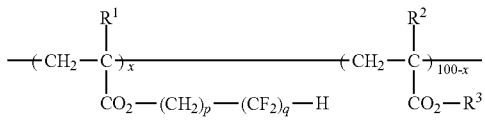

| | x | R¹ | p | q | R² | R³ | Mw |
|---|---|---|---|---|---|---|---|
| FP-193 | 80 | H | 2 | 4 | H | $C_4H_9(n)$ | 18000 |
| FP-194 | 90 | H | 2 | 4 | H | $-(CH_2CH_2O)_9-CH_3$ | 16000 |
| FP-195 | 90 | $CH_3$ | 2 | 4 | F | $C_6H_{13}(n)$ | 24000 |
| FP-196 | 80 | $CH_3$ | 1 | 8 | F | $C_4H_9(n)$ | 18000 |
| FP-197 | 95 | H | 2 | 6 | H | $-(C_3H_6)_7-H$ | 21000 |
| FP-198 | 90 | $CH_3$ | 3 | 6 | H | $-CH_2CH_2OH$ | 9000 |
| FP-199 | 75 | H | 1 | 8 | F | $CH_3$ | 12000 |
| FP-200 | 80 | H | 2 | 8 | H | $CH_2CH(C_3H_6)C_4H_9(n)$ | 34000 |
| FP-201 | 90 | $CH_3$ | 2 | 8 | H | $-(C_3H_6O)_7-H$ | 11000 |
| FP-202 | 80 | H | 3 | 8 | $CH_3$ | $CH_3$ | 18000 |
| FP-203 | 90 | H | 1 | 10 | F | $C_4H_9(n)$ | 27000 |
| FP-204 | 95 | H | 2 | 10 | H | $-(CH_2CH_2O)_9-CH_3$ | 12000 |
| FP-205 | 85 | $CH_3$ | 2 | 10 | $CH_3$ | $C_4H_9(n)$ | 20000 |
| FP-206 | 80 | H | 1 | 12 | H | $C_6H_{13}(n)$ | 8000 |
| FP-207 | 90 | H | 1 | 12 | H | $-(C_3H_6O)_{13}-H$ | 15000 |
| FP-208 | 60 | $CH_3$ | 3 | 12 | $CH_3$ | $C_2H_6$ | 12000 |
| FP-209 | 60 | H | 1 | 15 | H | $CH_2CH(C_3H_6)C_4H_9(n)$ | 20000 |
| FP-210 | 80 | $CH_3$ | 1 | 16 | H | $-(CH_2CH_2O)_2-C_4H_9(n)$ | 17000 |
| FP-211 | 90 | H | 1 | 18 | H | $-CH_2CH_2OH$ | 34000 |
| FP-212 | 60 | H | 3 | 18 | $CH_3$ | $CH_3$ | 19000 |

1-(15) Thickening Agent

In the film of the invention, a thickening agent may be used so as to adjust the viscosity of the coating liquid.

The thickening agent as used herein means a substance capable of increasing the viscosity of a solution when added. The increment of viscosity of the coating liquid, which is brought about by the addition, is preferably from 0.05 to 50 mPa·s, more preferably from 0.10 to 20 mPa·s, and most preferably from 0.10 to 10 mPa·s.

Examples of the thickening agent include, but are not limited to, the followings:
poly-ε-caprolactone,
poly-ε-caprolactone diol,
poly-ε-caprolactone triol,
polyvinyl acetate,
poly(ethylene adipate),
poly(1,4-butylene adipate),
poly(1,4-butylene glutarate),
poly(1,4-butylene succinate),
poly(1,4-butylene terephthalate),
poly(ethylene terephthalate),
poly(2-methyl-1,3-propylene adipate),
poly(2-methyl-1,3-propylene glutarate),
poly(neopentyl glycol adipate),
poly(neopentyl glycol sebacate),
poly(1,3-propylene adipate),
poly(1,3-propylene glutarate),
polyvinylbutyral,
polyvinylformal,
polyvinylacetal,
polyvinylpropanal,
polyvinylhexanal,
polyvinylpyrrolidone,
polyacrylic acid ester,
polymethacrylic acid ester,
cellulose acetate,
cellulose propionate, and
cellulose acetate butyrate.

Other than these, a known viscosity adjusting agent or thixotropy imparting agent, such as smectite, fluorotetrasilicon mica, bentonite, silica, montmorillonite and sodium polyacrylate described in JP1996-325491A (JP-H08-325491A), and ethyl cellulose, polyacrylic acid and organic clay described in JP1998-219136A (JP-H10-219136A), may be used.

1-(16) Coating Solvent

As for the solvent used in the coating composition for forming each layer of the invention, various solvents selected from the standpoint, for example, that the solvent can dissolve or disperse each component, readily provides a uniform surface state in the coating step and drying step, can ensure liquid storability or has an appropriate saturated vapor pressure, may be used.

Two or more kinds of solvents may be mixed and used. In view of the drying load, it is preferred that a solvent having a boiling point of 100° C. or lower at room temperature under atmospheric pressure is used as the main component and a small amount of a solvent having a boiling point of 100° C. or higher is contained for adjusting the drying speed.

Examples of the solvent having a boiling point of 100° C. or lower include hydrocarbons such as hexane (boiling point: 68.7° C.), heptane (98.4° C.), cyclohexane (80.7° C.), and benzene (80.1° C.); halogenated hydrocarbons such as dichloromethane (39.8° C.), chloroform (61.2° C.), carbon tetrachloride (76.8° C.), 1,2-dichloroethane (83.5° C.), and trichloroethylene (87.2° C.); ethers such as diethyl ether (34.6° C.), diisopropyl ether (68.5° C.), dipropyl ether (90.5° C.), and tetrahydrofuran (66° C.); esters such as ethyl formate (54.2° C.), methyl acetate (57.8° C.), ethyl acetate (77.1° C.), and isopropyl acetate (89° C.); ketones such as acetone (56.1° C.) and methyl ethyl ketone, (79.6° C.); alcohols such as methanol (64.5° C.), ethanol (78.3° C.), 2-propanol (82.4° C.), and 1-propanol (97.2° C.); cyano compounds such as acetonitrile (81.6° C.) and propionitrile (97.4° C.); and carbon disulfide (46.2° C.). Among these, ketones and esters are preferred, and ketones are particularly preferred. Among the ketones, 2-butanone is particularly preferred.

Examples of the solvent having a boiling point of 100° C. or higher include octane (125.7° C.), toluene (110.6° C.), xylene (138° C.), tetrachloroethylene (121.2° C.), chlorobenzene (131.7° C.), dioxane (101.3° C.), dibutyl ether (142.4° C.), isobutyl acetate (118° C.), cyclohexanone (155.7° C.), 2-methyl-4-pentanone (same as MIBK, 115.9° C.), 1-butanol (117.7° C.), N,N-dimethylformamide (153° C.), N,N-dimethylacetamide (166° C.), and dimethyl sulfoxide (189° C.). Among these, cyclohexanone and 2-methyl-4-pentanone are preferred.

1-(17) Others

These coating solvents are preferably used in the combination not so to cause precipitation due to insolubility each other.

To the film of the invention, a resin, a coupling agent, a coloration inhibitor, a coloring agent (a pigment or a dye), a defoaming agent, a leveling agent, a flame retardant, an ultraviolet absorbent, an infrared absorbent, an adhesion-imparting agent, a polymerization inhibitor, an antioxidant, a surface modifier, or the like may be added, in addition to the components as described above.

<Coating Method>

In the wet-on-wet multilayer-coating in which the position for coating the lower layer and the position for coating the upper layer are distant from each other, simultaneous multiplayer-coating in which the upper and lower layers are coated at the same time may be used, but multilayer-coating is preferably used, in which a thin layer can be relatively easily coated. Further, with respect to the simultaneous multilayer-coating, a die-coating method is preferably used. Examples of the die coating method include a slide coating method, an extrusion coating method, and a curtain coating method, but a slide coating method and an extrusion coating method are preferred, and extrusion coating method which is highly suitable for coating a thin layer is most preferred.

<Method for Producing Optical Film>

First, a first coating liquid for forming a resin layer 1b and a second coating liquid for forming a resin layer 1c are prepared. The first coating liquid includes at least the binder (resin) in 1-(1), the light-transmitting particle in 1-(8), and the coating solvent in 1-(16), as each described above. The second coating liquid includes the binder (resin) in 1-(1), and the coating solvents in 1-(8) and 1-(16), as each described above. The first coating liquid and the second coating liquid may have the substantially same compositions, but depending on the characteristics required for the optical film, the kinds of the light-transmitting particle, the resin, and the solvent included in the first coating liquid and the second coating liquid may be each altered so as to allow the desired characteristics for the first coating liquid and the second coating liquid to vary. Further, the first coating liquid includes a larger number of the light-transmitting particles than the second coating liquid. Alternatively, the second coating liquid may not include light-transmitting particles at all.

The preferred proportion of the first coating liquid is from 1 to 30%, the preferred proportion of the second coating liquid is from 0 to 15%, and the first coating liquid has the lower proportion of the particles.

Figure 3:
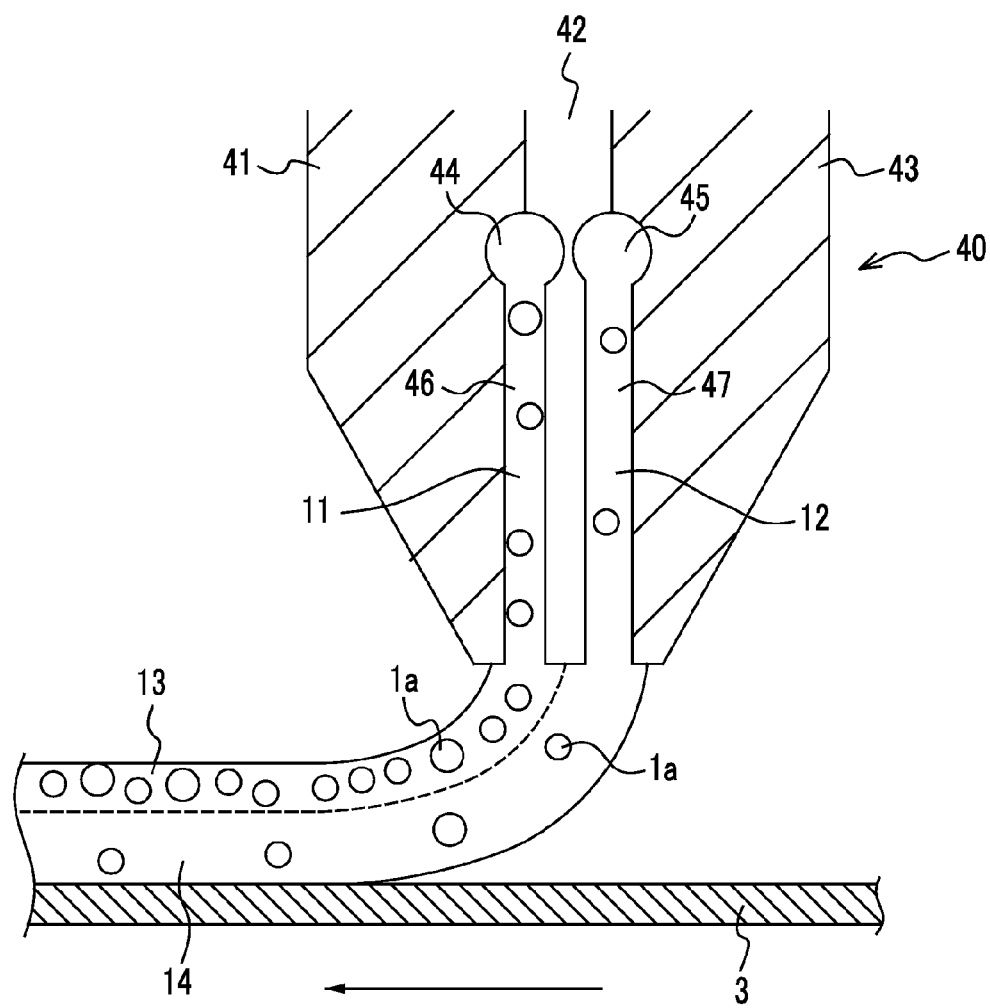
FIG. 3 is a conceptual view showing the multilayer-coating.

FIG. 3 is a conceptual view illustrating a state in which the first coating liquid and the second coating liquid are coated to form a multilayer on a support by an extrusion-type die coater. As seen from FIG. 3, the first coating liquid 11 and the second coating liquid 12 are supplied from an-type die coater 40 toward a traveling support 3. The die coater 40 is constituted with three die blocks 41, 42, and 43. By combining the three die blocks 41, 42, and 43, two internal pockets 44 and 45, and slots 46 and 47 extending to the tip of the die coater 40 from the pockets 44 and 45 are formed.

As seen in FIG. 3, the first coating liquid 11 and the second coating liquid 12 are supplied directly to the support 3. While not being limited thereto, other layers, for example, a hard coat layer may be provided on the surface of the support 3. In this case, the first coating liquid 11 and the second coating liquid 12 are supplied onto the hard coat layer on the support 3. Further, the light-transmitting particles 1a are dispersed in the first coating liquid 11 and the light-transmitting particles 1a are also dispersed in the second coating liquid 12.

The second coating liquid 12 is discharged from the slot 47 and supplied onto the support 3. The first coating liquid 11 is discharged from the slot 46 and supplied onto the second coating liquid 12. The first coating liquid 11 and the second coating liquid 12 are supplied simultaneously onto the support 3 to form a multilayer. Thus, a second coating film 14 and a first coating film 13 are formed on the support 3 and from the side of the support 3, respectively. However, the coating is not limited to simultaneous multilayer-coating. When the second coating film 14 is in the state before curing, the first coating film 13 can be sequentially formed on the second coating film 14.

The support 3 on which the first coating film 13 and the second coating film 14 have been formed is transported to a drying step. FIGS. 4A and 4B are each a schematic view illustrating drying of the first coating film 13 and the second coating film 14. As seen in FIGS. 4A and 4B, the first coating film 13 and the second coating film 14 are arranged on the upper side with respect to the support 3. Drying is performed in the state from FIG. 4A to FIG. 4B over time. In the drying step, a coating solvent including the first coating film 13 and the second coating film 14 is evaporated. While the coating solvent is evaporated, the light-transmitting particles 1a in the first coating film 13 are transferred to the side of the second coating film 14. In the antiglare layer 1, the light-transmitting particles 1a are unevenly distributed in the surface side of the resin layers 1b and 1c, and further, the light-transmitting particles 1a can be prevented from significantly protruding from the surface layer of the antiglare layer 1. Particularly, as compared with the light-transmitting particles 1a having small particle diameters, the light-transmitting particles 1a having large particle diameters are transferred to the side of the second coating film 14. The light-transmitting particles 1a having large particle diameters can be arranged on the side of the support 3. This means that even when the light-transmitting particles 1a having large particle diameters are included in the first coating liquid 11 and the second coating liquid 12, the point defects can be prevented. Accordingly, the number of classification during production of the light-transmitting particles 1a can be reduced. The light-transmitting particles 1a can be produced at lower cost.

The film thickness of the first coating film 13 is preferable two times or less the average particle diameter of the light-transmitting particles 1a. When forming the antiglare layer 1, the light-transmitting particles 1a can be inhibited from being stacked in the resin layers 1b and 1c. Thus, generation of point defects can be inhibited.

The film thickness of the first coating film 13 and the film thickness of the second coating film are a ratio of about 1:2 in the configuration of FIGS. 4A and 4B, although this does not limit the invention. The second coating film 14 is any one having a film thickness which allows the light-transmitting particles 1a to be sunk slightly.

By adjusting the viscosity of the first coating film 13 and the second coating film 14, the amount of the light-transmitting particles 1a being transferred from the first coating film 13 to the second coating film 14 can be adjusted.

70% or more of the coating solvent of the first coating film 13 and the second coating film 14 is evaporated, and then the support 3 is transported to a curing step.

In the curing step, the first coating film 13 and the second coating film 14 are irradiated with ionizing radiation. By irradiation with ionizing radiation, the resin in the first coating film 13 and the second coating film 14 initiates a crosslinkable reaction or polymerization reaction. The antiglare layer 1 having the light-transmitting particles 1a and the resin layer 1b is formed on the support 3.

Thereafter, as desired, a functional layer including a low refractive index layer, a high refractive index layer/a low refractive index layer, or a high refractive index layer/a medium refractive index layer/a low refractive index layer is formed on the antiglare layer 1.

EXAMPLES

The invention will be described in more detail below with reference to Examples, but the invention should not be construed as being limited thereto. Further, unless otherwise specifically indicated, the "parts" and "%" are on the mass basis.

The coating liquids for antiglare layers used in the present Examples are shown below.

(First Coating Liquid)

| Composition of first coating liquid 1 | |
|---|---|
| PET-30 | 23.0 parts by mass |
| VISCOAT 360 | 13.8 parts by mass |
| MX-600 (light-transmitting particle: average particle diameter 6.0 μm) | 2.7 parts by mass |
| SSX106FB (light-transmitting particle: average particle diameter 6.0 μm) | 2.7 parts by mass |
| IRGACURE 127 | 1.9 parts by mass |
| SP-13 | 0.1 parts by mass |
| Polymethyl methacrylate (20%) | 5.2 parts by mass |
| Methyl isobutyl ketone | 27.3 parts by mass |
| Methyl ethyl ketone | 23.3 parts by mass |

| Composition of first coating liquid 2 | |
|---|---|
| PET-30 | 15.9 parts by mass |
| DPHA | 9.5 parts by mass |
| SX-350 HL (light-transmitting particle: average particle diameter 3.5 μm) | 15.8 parts by mass |
| IRGACURE 127 | 1.9 parts by mass |
| SP-13 | 0.1 parts by mass |
| Polymethyl methacrylate (20%) | 5.2 parts by mass |
| Methyl isobutyl ketone | 41.5 parts by mass |
| Methyl ethyl ketone | 10.1 parts by mass |

| Composition of first coating liquid 3 | |
| --- | --- |
| PET-30 | 40.3 parts by mass |
| MX-1000 (light-transmitting particle: average particle diameter 10 μm) | 1.6 parts by mass |
| IRGACURE 819 | 1.4 parts by mass |
| IRGACURE 907 | 0.5 parts by mass |
| SP-13 | 0.1 parts by mass |
| Polymethyl methacrylate (20%) | 5.2 parts by mass |
| Methyl isobutyl ketone | 23.8 parts by mass |
| Methyl ethyl ketone | 27.1 parts by mass |

(Second Coating Liquid)

| Composition of second coating liquid 1 | |
| --- | --- |
| PET-30 | 25.7 parts by mass |
| VISCOAT 360 | 15.4 parts by mass |
| IRGACURE 127 | 1.9 parts by mass |
| SP-13 | 0.1 parts by mass |
| Polymethyl methacrylate (20%) | 12.3 parts by mass |
| Methyl isobutyl ketone | 14.7 parts by mass |
| Methyl ethyl ketone | 29.9 parts by mass |

| Composition of second coating liquid 2 | |
| --- | --- |
| PET-30 | 19.9 parts by mass |
| DPHA | 12.0 parts by mass |
| SX-350 HL (light-transmitting particle: average particle diameter 3.5 μm) | 0.1 parts by mass |
| IRGACURE 127 | 1.4 parts by mass |
| SP-13 | 0.1 parts by mass |
| Polymethyl methacrylate (20%) | 3.9 parts by mass |
| Methyl isobutyl ketone | 26.5 parts by mass |
| Methyl ethyl ketone | 36.2 parts by mass |

| Composition of second coating liquid 3 | |
| --- | --- |
| PET-30 | 59.8 parts by mass |
| MX-1000 (light-transmitting particle: average particle diameter 10 μm) | 0.1 parts by mass |
| IRGACURE 819 | 2.0 parts by mass |
| IRGACURE 907 | 0.8 parts by mass |
| SP-13 | 0.2 parts by mass |
| Polymethyl methacrylate (20%) | 28.0 parts by mass |
| Methyl ethyl ketone | 9.1 parts by mass |

(Antiglare Layer Coating Liquid)

| Composition of antiglare layer coating liquid 1 | |
| --- | --- |
| PET-30 | 29.7 parts by mass |
| VISCOAT 360 | 17.8 parts by mass |
| MX-600 (light-transmitting particle: average particle diameter 6.0 μm) | 1.9 parts by mass |
| SSX106FB (light-transmitting particle: average particle diameter 6.0 μm) | 1.9 parts by mass |
| IRGACURE 127 | 2.3 parts by mass |
| SP-13 | 0.2 parts by mass |
| Polymethyl methacrylate (20%) | 3.8 parts by mass |
| Methyl isobutyl ketone | 22.9 parts by mass |
| Methyl ethyl ketone | 19.5 parts by mass |

| Composition of antiglare layer coating liquid 2 | |
| --- | --- |
| PET-30 | 31.0 parts by mass |
| VISCOAT 360 | 18.6 parts by mass |
| MX-600 (light-transmitting particle: average particle diameter 6.0 μm) | 1.1 parts by mass |
| SSX106FB (light-transmitting particle: average particle diameter 6.0 μm) | 1.1 parts by mass |
| IRGACURE 127 | 2.3 parts by mass |
| SP-13 | 0.2 parts by mass |
| Polymethyl methacrylate (20%) | 3.8 parts by mass |
| Methyl isobutyl ketone | 19.9 parts by mass |
| Methyl ethyl ketone | 22.0 parts by mass |

| Composition of antiglare layer coating liquid 3 | |
| --- | --- |
| PET-30 | 21.4 parts by mass |
| DPHA | 12.9 parts by mass |
| SX-350 HL (light-transmitting particle: average particle diameter 3.5 μm) | 2.8 parts by mass |
| IRGACURE 127 | 1.6 parts by mass |
| SP-13 | 0.1 parts by mass |
| Polymethyl methacrylate (20%) | 2.7 parts by mass |
| Methyl isobutyl ketone | 29.0 parts by mass |
| Methyl ethyl ketone | 29.5 parts by mass |

| Composition of antiglare layer coating liquid 4 | |
| --- | --- |
| PET-30 | 49.6 parts by mass |
| MX-1000 (light-transmitting particle: average particle diameter 10 μm) | 2.2 parts by mass |
| IRGACURE 819 | 1.7 parts by mass |
| IRGACURE 907 | 0.6 parts by mass |
| SP-13 | 0.2 parts by mass |
| Polymethyl methacrylate (20%) | 3.8 parts by mass |
| Methyl isobutyl ketone | 19.9 parts by mass |
| Methyl ethyl ketone | 22.0 parts by mass |

For the viscosity of the coating liquid, the viscosity of the first coating liquid 1 was 6.2 mPa·s, the viscosity of the first coating liquid 2 was 7.9 mPa·s, the viscosity of the first coating liquid 3 was 4.3 mPa·s, the viscosity of the second coating liquid 1 was 12.8 mPa·s, the viscosity of the second coating liquid 2 was 4.88 mPa·s, the viscosity of the second coating liquid 3 was 20.08 mPa·s, the viscosity of the antiglare layer coating liquid 1 was 6.2 mPa·s, the viscosity of the antiglare layer coating liquid 2 was 6.0 mPa·s, the viscosity of the antiglare layer coating liquid 3 was 6.2 mPa·s, and the viscosity of the antiglare layer coating liquid 4 was 6.1 mPa·s. The viscosity was measured at 25° C.

The compounds that are respectively used are shown below.

DPHA: a mixture of dipentaerythritol pentaacrylate and dipentaerythritol hexaacrylate (manufactured by Nippon Kayaku Co., Ltd.)

PET-30: a mixture of pentaerythritol triacrylate and pentaerythritol tetraacrylate [manufactured by Nippon Kayaku Co., Ltd.]

VISCOAT 360: trimethylolpropane EO-added triacrylate [manufactured by Osaka Organic Chemical Industry Ltd.]

IRGACURE 127: polymerization initiator [manufactured by BASF Japan]

IRGACURE 819: polymerization initiator [manufactured by BASF Japan]

IRGACURE 907: polymerization initiator [manufactured by BASF Japan]

Polymethyl methacrylate (20%): a solution formed by dissolving 20 parts by mass of polymethyl methacrylate powder (mass average molecular weight 120,000, manufactured by Aldrich) in 80 parts by mass of methyl ethyl ketone MX-600: a crosslinked polymethyl methacrylate particle having an average particle diameter of 6.0 μm and a refractive index of 1.50, manufactured by Soken Chemical & Engineering Co.

MX-1000: a crosslinked polymethyl methacrylate particle having an average particle diameter of 10 μm and a refractive index of 1.50, manufactured by Soken Chemical & Engineering Co.

SX-350HL: a crosslinked acryl-styrene particle having an average particle diameter of 3.5 μm and a refractive index of 1.55, manufactured by Soken Chemical & Engineering Co.

SSX106FB: a crosslinked acryl-styrene fine particle having an average particle diameter of 6.0 μm and a refractive index of 1.55, manufactured by Sekisui Plastics Co., Ltd.

SP-13: a fluorine-based surfactant (40% by mass MEK solution)

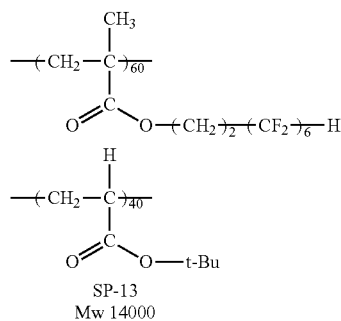

SP-13
Mw 14000

(Preparation of Optical Film 101)
(Condition for Coating)

The first coating liquid 1 and the second coating liquid 1 are simultaneously multilayer-coated on a triacetyl cellulose film (TAC-TD80U, manufactured by Fujifilm Corp.) at a continuous conveying speed of 30 m/min using an extrusion type die coater to form a first coating film having a wet coat film thickness of 10 μm and a second coating film having a wet coat film thickness of 25 μm.

(Condition for Drying)

Immediately after coating, the film was dried at 30° C. for 15 seconds and at 60° C. for 30 seconds to evaporate the solvent in the coating film. At this time, the first coating film and the second coating film were dried to be arranged on the upper side with respect to the support.

(Condition for UV Curing)

The coated layer was cured by irradiating an ultraviolet ray thereon at an irradiation dose of 160 mJ/cm² using an air-cooled metal halide lamp (manufactured by Eye Graphics Co., Ltd.) of 160 W/cm under nitrogen purging to form an antiglare layer having an antiglare property and an average layer thickness of 12.5 μm, and the resulting film was taken up to prepare an optical film 101.

(Preparation of Optical Film 102)

Under the same condition as for the optical film 101 except that the first coating liquid 2 (wet coat film thickness of 6 μm) and the second coating liquid 2 (wet coat film thickness of 20 μm) were coated on a triacetylcellulose film, instead of the first coating liquid 1 and the second coating liquid 1, to form an antiglare layer having an average layer thickness of 7.4 μm, an optical film 102 was prepared.

(Preparation of Optical Film 103)

Under the same condition as for the optical film 101 except that the first coating liquid 3 (wet coat film thickness of 15 μm) and the second coating liquid 3 (wet coat film thickness of 25 μm) were coated on a triacetylcellulose film, instead of the first coating liquid 1 and the second coating liquid 1, to form an antiglare layer having an average layer thickness of 19.0 μm, an optical film 103 was prepared.

(Preparation of Optical Film 104)

Under the same condition as for the optical film 101 except that the antiglare layer coating liquid 1 (wet coat film thickness of 30 μm) was coated on a triacetylcellulose film, instead of the first coating liquid 1 and the second coating liquid 1, to form an antiglare layer having an average layer thickness of 13.2 μm, an optical film 104 was prepared.

(Preparation of Optical Film 105)

Under the same condition as for the optical film 101 except that the antiglare layer coating liquid 2 (wet coat film thickness of 30 μm) was coated on a triacetylcellulose film, instead of the first coating liquid 1 and the second coating liquid 1, to form an antiglare layer having an average layer thickness of 13.2 μm, an optical film 105 was prepared.

(Preparation of Optical Film 106)

Under the same condition as for the optical film 101 except that the antiglare layer coating liquid 3 (wet coat film thickness of 25 μm) was coated on a triacetylcellulose film, instead of the first coating liquid 1 and the second coating liquid 1, to form an antiglare layer having an average layer thickness of 6.3 μm, an optical film 106 was prepared.

(Preparation of Optical Film 107)

Under the same condition as for the optical film 101 except that the antiglare layer coating liquid 4 (wet coat film thickness of 50 μm) was coated on a triacetylcellulose film, instead of the first coating liquid 1 and the second coating liquid 1, to form an antiglare layer having an average layer thickness of 22.0 μm, an optical film 107 was prepared.

The optical films 101 to 107 produced were evaluated. Further, the evaluation was explained with reference to the optical film 101, but the optical films 102 to 107 were also evaluated in the same manner.

(Particle Position and Layer Thickness L)

For the optical film 101, the antiglare layer is cut in the vertical direction with a microtome using a diamond knife. The shortest distance from the center of the particles to the triacetylcellulose film is measured using an optical microscope. A hundred light-transmitting particles were separately measured, the distances were classified in accordance with the positions below, at which the light-transmitting particles were included, and the ratios were determined.

Position (1) 2L/3−A/6 to L−A/2
Position (2) L/3+A/6 to 2L/3−A/6
Position (3) A/2 to L/3+A/6

(A: average particle diameter, and L: average layer thickness of antiglare layers)

Furthermore, for the average layer thickness of the antiglare layers, a shortest distance from the air interface of the cut article to the triacetyl cellulose film was measured at three points in any of the same sample, and the average value was L.

(Evaluation of Surface Profile)

The mean spacing (Sm) of the irregularities of the surface roughness of the optical film 101 was measured using a stylus-type surface roughness meter "SURFCORDER SE3500"

(manufactured by Kosaka Laboratory Ltd.) set in accordance with JIS-B0601 (1994), and the values derived from the surface roughness meter were employed.

(Reflection: Antiglare Property)

The entire backside of the optical film 101 was painted with a black magic color, and then the state of reflection of light when the light of a fluorescent lamp was reflected on the surface of the film was evaluated.

B: Reflection is sufficiently inhibited or light is sufficiently diffused, and this is not bothersome.

C: The figure of the fluorescent lamp is slightly reflected, but is not bothersome.

D: The figure of the fluorescent lamp is clearly reflected, and is glaring and bothersome.

The level of C or higher was judged as passed.

(Black Clarity when Displaying Black <Black Reproducibility>)

A polarizing film was prepared by adsorbing iodine to a stretched polyvinyl alcohol film. The optical film 101 was saponified and attached to one side of the polarizing film by using a polyvinyl alcohol-based adhesive, such that the triacetylcellulose side of the optical film came to the polarizing film side. Further, a commercially available triacetylcellulose film "FUJITAC TD80UF" (manufactured by Fujifilm Corp.) was attached to the polarizing film surface opposite the side where optical film 101 had been attached, by using a polyvinyl alcohol-based adhesive. In this way, a polarizing plate (HKH-01) to which the optical film 101 had been attached was prepared.

The polarizing plate on the viewing side of a 32 inch full High-Vision liquid crystal TV "LC-32DS6" (manufactured by Sharp Corp., pixel size of 370 µm) was stripped off, and the polarizing plate (HKH-01) was attached instead to the viewing side though an adhesive such that the optical film came to the outmost surface. Generally, the panel was driven in a black display mode under the general home environment using TV (about 200 Lx), and the white-brownish appearance was judged with the naked eye. For the evaluation criteria while viewing with the naked eye, a case where the degree of blackness is high and good is rated A, a case where the degree of blackness is good is rated B, a case where a slight white-brownish appearance is generated but is not bothersome is rated C, and a case where a white-brownish appearance is generated is rated D. The level of C or higher is judged as passed.

(Evaluation of Point Defects Attributable to Coarse Particles)

In the optical film 101, the point defects attributable to coarse particles were counted in transmitted light with an eye in a range of 1.34 m'D5.00 m.

B: Less than 1.
C: 1 or more and less than 2.
D: 2 or more.

The level of C or higher was judged as passed.

TABLE 1

| Optical film | Position (1) % | Position (2) % | Position (3) % | L/A | Sm (µm) | Reflection | Black clarity | Black clarity |
|---|---|---|---|---|---|---|---|---|
| 101 | 90 | 7 | 3 | 2.1 | 57 | C | B | B |
| 102 | 98 | 1 | 1 | 2.1 | 47 | B | C | B |
| 103 | 50 | 41 | 9 | 1.9 | 80 | C | B | B |
| 104 | 35 | 22 | 43 | 2.2 | 45 | C | C | D |
| 105 | 26 | 25 | 49 | 2.2 | 120 | D | A | C |
| 106 | 43 | 16 | 41 | 1.8 | 38 | B | D | C |
| 107 | 3 | 17 | 80 | 2.2 | 81 | C | B | D |

For the optical films 101 to 103, the results of evaluation of the reflection, the black clarity, and the point defects were C or higher. Since the optical film 104 had the particles stacked in the vertical direction, the point defects were evaluated as D. Since the optical film 105 had the particles sinking to the support side (having many positions (3)), it had a lower number of the surface irregularities and the reflection was evaluated as D. Since the optical film 106 had a lower period of irregularities (having a small Sm value), the antiglare property is high and the black clarity was evaluated as D. Since the optical film 107 had the particles stacked in the vertical direction, the point defects were evaluated as D.

In the optical film 101, a sample obtained by changing the support to a triacetyl cellulose film having a thickness of 60 µm. The evaluation was conducted in the same manner as for the optical film 101, and as a result, it could be seen that the optical film produced is an excellent optical film having a good antiglare property, good black clarity, and point defects attributable to coarse particles of the light-transmitting fine particles were hardly visible. That is, it could be confirmed that the optical film of the present embodiment exhibits excellent effects without being affected by the thickness of the support.

What is claimed is:

1. A method for producing an optical film, comprising:
a step of preparing a first coating liquid containing a certain amount of light-transmitting particles, a first resin, and a first solvent, a second coating liquid containing an amount less than the certain amount of light-transmitting particles, a second resin, and a second solvent;
a step of coating the second coating liquid and the first coating liquid in this order from the support side on a traveling band-shaped support in the form of a multilayer to form a second coating film and a first coating film;
a step of allowing the light transmitting particles in the first coating film to drop downwardly due to a gravitational force and thereby transferring the light-transmitting particles in the first coating film to the side of the second coating film while drying the first coating film and the second coating film; and
a step of curing, the first coating film and the second coating film to form an antiglare layer including the light-transmitting particles and a resin layer,
wherein when the average particle diameter of the light-transmitting particles is A and the average layer thickness of the antiglare layer is L, the presence ratio of the central position of the light-transmitting particle and the distance thereof from the support side in the resin layer, when viewing the cross-section in the vertical direction of the antiglare layer, satisfy the following relationship:

$$2L/3 - A/6 \text{ to } L - A/2: 40\% \text{ to } 98\% \quad (1)$$

$$L/3 + A/6 \text{ to } 2L/3 - A/6: 1\% \text{ to } 50\% \quad (2)$$

$$A/2 \text{ to } L3 + A/6: 1\% \text{ to } 10\% \quad (3).$$

2. The method for producing an optical film according to claim 1, wherein the film thickness of the first coating film is one time or more and less than two times the average particle diameter A of the light-transmitting particles.

3. The method for producing an optical film according to claim 2, wherein the first coating film and the second coating film are arranged on the upper side with respect to the support when the first coating film and the second coating film are dried.

4. The method for producing an optical film according to claim 3, wherein the average layer thickness L of the resin layer and the average particle diameter A of the light-transmitting particles satisfy a relationship of 1.2<L/A<3.6.

5. The method for producing an optical film according to claim 3, wherein the light-transmitting particle has an average particle diameter of more than 1.5 μm and 10 μm or less.

6. The method for producing an optical film according to claim 3, wherein the second coating liquid does not contain the light-transmitting particles.

7. The method for producing an optical film according to claim 2, wherein the average layer thickness L of the resin layer and the average particle diameter A of the light-transmitting particles satisfy a relationship of 1.2<L/A<3.6.

8. The method for producing an optical film according to claim 7, wherein the second coating, liquid does not contain the light-transmitting particles.

9. The method for producing an optical film according to claim 2, wherein the light-transmitting particle has an average particle diameter of more than 1.5 μm and 10 μm or less.

10. The method for producing an optical film according to claim 2, wherein the second coating liquid does not contain the light-transmitting particles.

11. The method for producing an optical film according to claim 1, wherein the first coating film and the second coating film are arranged on the upper side with respect to the support when the first coating film and the second coating film are dried.

12. The method for producing an optical film according to claim 11, wherein the average layer thickness L of the resin layer and the average particle diameter A of the light-transmitting particles satisfy a relationship of 1.2<L/A<3.6.

13. The method for producing an optical film according to claim 12, wherein the second coating liquid does not contain the light-transmitting particles.

14. The method for producing an optical film according to claim 11, wherein the light-transmitting particle has an average particle diameter of more than 1.5 μm and 10 μm or less.

15. The method for producing an optical film according to claim 11, wherein the second coating liquid does not contain the light-transmitting particles.

16. The method for producing an optical film according to claim 1, wherein the average layer thickness L of the resin layer and the average particle diameter A of the bight-transmitting particles satisfy a relationship of 1.2<L/A<3.6.

17. The method for producing an optical film according to claim 16, wherein the second coating liquid does not contain the light-transmitting particles.

18. The method for producing an optical film according to claim 16, wherein the average layer thickness L of the resin layer and the average particle diameter A of the light-transmitting particles satisfy a relationship of 1.9<L/A<3.6.

19. The method for producing an optical film according to claim 1, wherein the light-transmitting particle has an average particle diameter of more than 1.5 μm and 10 μm or less.

20. The method for producing an optical film according to claim 1, wherein when a mean spacing of irregularities of the antiglare layer is Sm, the antiglare layer has a mean spacing of irregularities of Sm>40 μm.

21. The method for producing an optical film according to claim 1, wherein the second coating liquid does not contain the light-transmitting particles.

22. The method for producing an optical film according to claim 1, wherein in the forming the second coating film and the first coating film, the second coating liquid and the first coating liquid are coated simultaneously on the support in the form of multilayer in an order of second coating liquid and the first coating liquid from the support side.

23. The method for producing the optical film according to claim 1, a speed of the drop of the light transmitting particles in the first coating film due to the gravitational force is adjusted by adjusting viscosities of the first coating film and the second coating film, thereby a movement amount of the light transmitting particles in the first coating film being transferred from the first coating film to the second coating film is adjusted.

24. The method for producing the optical film according to claim 1,
wherein when the average particle diameter of the light-transmitting particles is A and the average layer thickness of the antiglare layers is L, the presence ratio of the central position of the light-transmitting particle and the distance thereof from the support side in the resin layer, when viewing the cross-section in the vertical direction of the antiglare layer, satisfy the following relationship $$2L/3-A/6 \text{ to } L-A/2: 40\% \text{ to } 90\% \tag{1}$$

$$L/3+A/6 \text{ to } 2L/3-A/6: 7\% \text{ to } 50\% \tag{2}$$

$$A/2 \text{ to } L/3+A/6: 3\% \text{ to } 10\% \tag{3}.$$

* * * * *